(12) United States Patent
Matsumoto et al.

(10) Patent No.: US 7,898,908 B2
(45) Date of Patent: Mar. 1, 2011

(54) HEAD FOR THERMALLY ASSISTED MAGNETIC RECORDING DEVICE AND THERMALLY ASSISTED MAGNETIC RECORDING DEVICE

(75) Inventors: Takuya Matsumoto, Hachioji (JP);
Kimio Nakamura, Fujisawa (JP);
Yoshio Takahashi, Koganei (JP)

(73) Assignee: Hitachi, Ltd., Tokyo (JP)

( * ) Notice: Subject to any disclaimer, the term of this patent is extended or adjusted under 35 U.S.C. 154(b) by 1083 days.

(21) Appl. No.: 11/498,869

(22) Filed: Aug. 4, 2006

(65) Prior Publication Data

US 2007/0041119 A1 Feb. 22, 2007

(30) Foreign Application Priority Data

Aug. 19, 2005 (JP) ............................. 2005-238908

(51) Int. Cl.
*G11B 5/02* (2006.01)
(52) U.S. Cl. .............. 369/13.13; 369/13.26; 369/13.23; 360/59
(58) Field of Classification Search .............. 369/13.13, 369/13.23, 13.26; 360/59
See application file for complete search history.

(56) References Cited

U.S. PATENT DOCUMENTS

| 6,055,220 | A * | 4/2000 | Mamin et al. ............. 369/13.13 |
| 6,649,894 | B2 * | 11/2003 | Matsumoto et al. ...... 250/201.3 |
| 6,922,376 | B1 * | 7/2005 | Nakaoki et al. ........... 369/13.33 |
| 6,949,732 | B2 | 9/2005 | Kiguchi et al. |
| 7,054,234 | B2 * | 5/2006 | Saga et al. ................ 369/13.33 |
| 2003/0021065 | A1 * | 1/2003 | Yamada et al. ............... 360/126 |
| 2004/0085862 | A1 * | 5/2004 | Matsumoto et al. ...... 369/13.33 |
| 2005/0068675 | A1 * | 3/2005 | Sasaki et al. ................ 360/126 |

OTHER PUBLICATIONS

Jpn. J. Appl. Phys. vol. 38 (1999) pp. 1839-1840, Part 1, No. 3B 1999.
Technical Digest of 6$^{th}$ international conference on near field optics and related techniques, the Netherlands, Aug. 27-31, 2000, pp. 55.

* cited by examiner

*Primary Examiner*—William J. Klimowicz
*Assistant Examiner*—Andrew J Sasinowski
(74) *Attorney, Agent, or Firm*—Antonelli, Terry, Stout & Kraus, LLP.

(57) ABSTRACT

To reduce background light generated in a circumference of a scatterer in a head for a thermally assisted magnetic recording device using a scatterer having conductivity as an optical near-field generating element, a coil for generating a magnetic field is placed on a bottom portion of a slider, and an optical near-field generating element is placed in an inside of the coil. At this time, an inner diameter of the coil is set not larger than a wavelength of incident light, an interval between leader lines each for conducting an electric current to the coil is set not larger than a half of the wavelength of the light, and the coil for generating the magnetic field is caused to function as a shield for suppressing the background light.

12 Claims, 22 Drawing Sheets

HEAD FOR THERMALLY ASSISTED MAGNETIC RECORDING DEVICE AND THERMALLY ASSISTED MAGNETIC RECORDING DEVICE

CLAIM OF PRIORITY

The present application claims priority from Japanese application JP 2005-238908 filed on Aug. 19, 2005, the contents of which is hereby incorporated by reference into this application.

BACKGROUND OF THE INVENTION

1. Field of the Invention

The present invention relates to a head for a thermally assisted magnetic recording device and a thermally assisted magnetic recording device.

2. Description of the Related Art

Recently, there has been proposed a thermally assisted magnetic recording method as a recording method achieving a recording density of not less than 1 Tn/in$^2$ (H. Saga, H. Nemoto, H. Sukeda, and M. Takahashi [1999], "*J. Appl. Phys*". 38, Part 1, 1839, Japan). In a conventional magnetic recording device, there is a problem that recorded information is lost due to thermal fluctuations when a recording density becomes not less than 1 Tn/in$^2$. To prevent this, it is necessary to increase coercivity of a medium. However, since the intensity of a magnetic field which can be generated is limited in size, it becomes impossible to form a recording bit on the recording medium when the coercivity is excessively increased. To solve this problem, in a thermally assisted magnetic recording method, at the right moment of recording, the medium is optically heated to decrease the coercivity. By this, recording on a medium having high coercivity becomes possible, thereby it becomes possible to achieve the recording density of 1 Tb/in$^2$.

In this thermally assisted magnetic recording device, it is necessary that a spot diameter of irradiating light should be comparable with a recording bit in size (several 10 nm). Because, when it is larger than that, information in an adjacent track is deleted. To heat such a minute region, an optical near-field is used. The optical near-field is a localized electromagnetic field (the light whose wave number has an imaginary number component) which is present in a vicinity of a small object whose size is not larger than the wavelength of light. The optical near-field is generated by using a minute aperture with a diameter which is not larger than the light wavelength or by using a metal scatterer. For example, there has been proposed an optical near-field generator using a metal scatterer being triangular in shape as a highly effective optical near-field generator in "*Technical Digest*" of 6$^{th}$ international conference on near field optics and related techniques, the Netherlands, Aug. 27-31, 2000, p. 55. When light is made incident on a metal scatterer, plasmon resonance is exited in the metal scatterer so that an intensified optical near-field is generated at an apex of the triangle. By using this optical near-field generator, it becomes possible to highly effectively concentrate light in a region which is not larger than several 10 nm.

In a case where a medium is heated by using an optical near-field generator using the above-described metal scatterer, light which is not irradiated on the metal scatterer is made incident on the medium as background light. The spot diameter of this background light equals to the spot diameter of the incident light, but the spot diameter of the incident light cannot be made smaller than the incident light wavelength due to a diffraction limit. Therefore, the medium is heated in the circumference of a region where the optical near-field is present, the region being several 10 nm. Consequently, there is a possibility that information in an adjacent track is deleted by the heating by this background light.

SUMMARY OF THE INVENTION

It is an object of the present invention to reduce generation of background light in a thermally assisted magnetic recording head.

The above-described object can be achieved by the following configuration. That is, a circular coil for generating a magnetic field is placed on a bottom portion of a slider, and a scatterer having conductivity for generating an optical near-field is provided inside the coil. In this case, a width of the inside of the coil is not larger than the wavelength of incident light, and an interval between leader lines for conducting an electric current to the coil is not larger than a half of the light wavelength, so that a magnetic field generating coil is caused to function as a shield for suppressing the background light. Here, the width of the inside of the coil means a width of the smallest portion out of widths of spaces opened in the coil center.

It is preferable that the direction of polarization of the light, which is made incident on the above-described configuration, is set parallel to a slit of a portion where the leader lines are attached. By this, an amount of light leaking from the leader line portion can be reduced.

In the case of the present invention, in a thermally assisted magnetic recording head using a scatterer having conductivity as an optical near-field generating element, it is possible to reduce influence of the background light generated in the circumference of the scatterer.

BRIEF DESCRIPTION OF DRAWINGS

FIG. 5A is a graph in a case where the coil is present, and FIG. 5B is a graph in a case where the coil is absent.

FIG. 7A is a view of the coil in which an inside diameter varies in two stages, and FIG. 7B is a view of the coil in which an inside diameter varies in three stages.

FIG. 23A is a view in a case where the shading film is formed on the leader lines, and FIG. 23B is a view in a case where the shading film is formed on the entire coil.

FIG. 24A is a view in a case where the shading film is formed on an upper side of the coil, and FIG. 24B is a view in a case where the shading film is formed on an lower side of the coil.

FIG. 25A is a view in a case where an angle formed by the two leader lines is 90 degree, and FIG. 25B is a view in a case where the leader lines are attached to portions apart from the slit of the coil.

FIG. 26A is a view in a case where the leader lines intersect at right angles, and FIG. 26B is a view in a case where an angle formed by the leader lines is 180 degrees.

FIG. 30A is a general view, and FIG. 30B is a view in a case where a width of the inside of the coil varies in an upper side and a lower side of the coil.

DETAILED DESCRIPTION OF THE PREFERRED EMBODIMENTS

Figure 1:
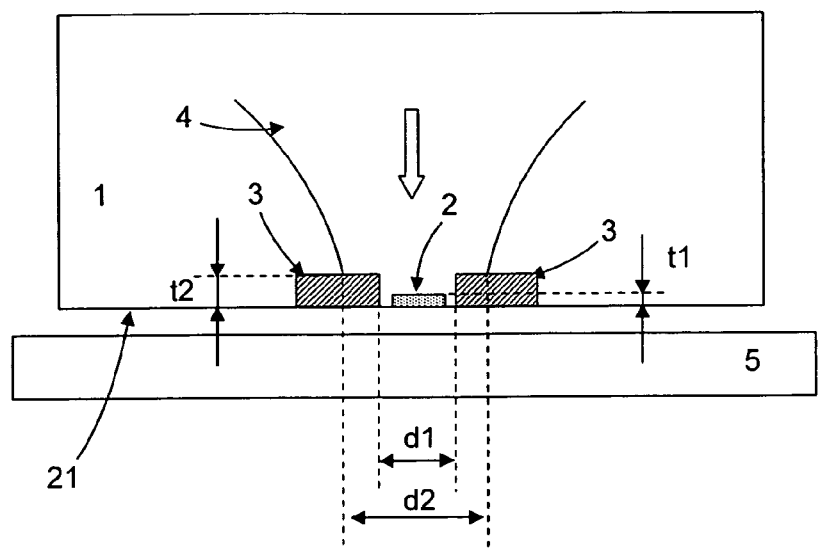
FIG. 1 is a cross-sectional view showing an example of a thermally assisted magnetic recording head of the present invention.

Embodiments of the present invention will be described below by referring to the drawings.

First Embodiment

In a head for a thermally assisted magnetic recording device of the present invention, as shown in FIG. 1, a circular coil 3 is placed on a bottom portion of a slider 1 to be a main body of the head, and a scatterer 2 having conductivity for generating an optical near-field is placed in the center of the coil. Incident light 4 is made incident from an upper side of the coil 3. Here, the upper side means a side which is opposed to a side where a medium 5 is placed. In this case, a width d1 of the inside of the coil 3 is not larger than a spot diameter (d2) of the incident light 4, that is, not larger than the wavelength of the incident light. Accordingly, the background light generated in the circumference of an optical near-field generating element (a scatterer) 2 is eliminated. Here, the width of the inside of the coil means a width of the smallest portion of widths out of spaces opened in the coil center.

Figure 2:
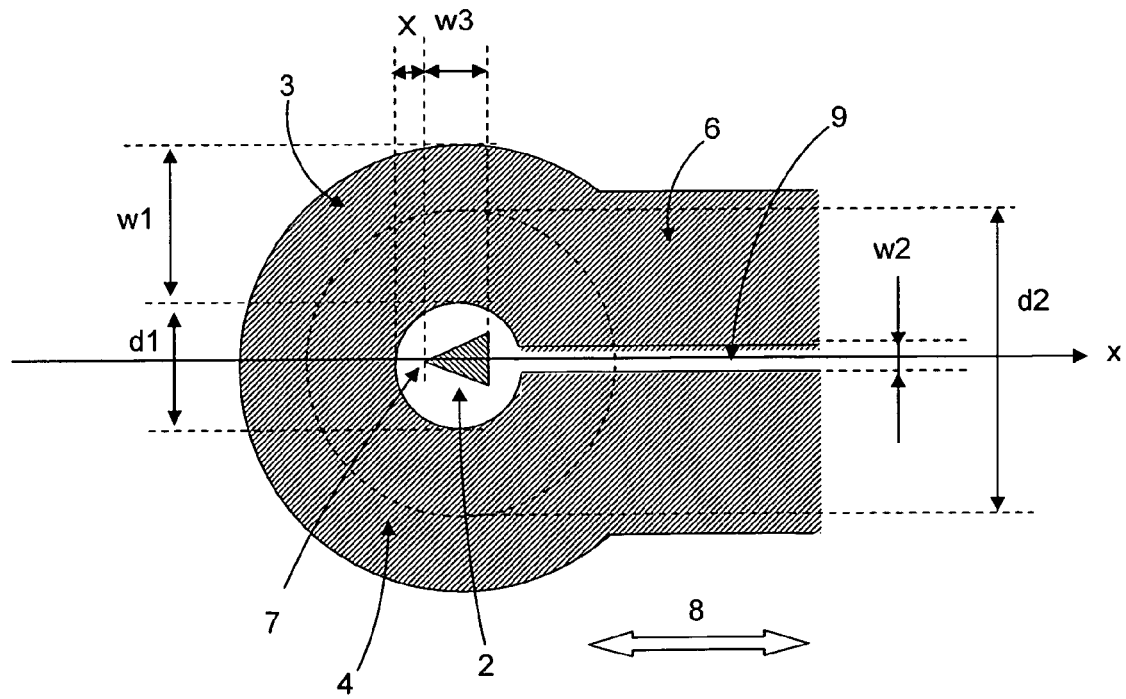
FIG. 2 is a top view of a coil.

In the present embodiment, the slider 1, whose portion allows the light to transmit and is made of quartz, is used. The coil 3 and the metal scatterer 2, as shown in FIG. 2, are embedded in the bottom portion of the slider. The coil 3 is circular in shape. The metal scatterer 2 being triangular in shape for generating the optical near-field is placed inside the coil. A material of the coil 3 is copper and a thickness t2 is set at 800 nm. The material of the coil 3 may be any metals such as gold, silver and aluminum as long as the material has conductivity. It is preferable that a size of the scatterer for generating the optical near-field is adjusted in order to generate plasmon resonance, and in the present embodiment, a width w3 is set at 100 nm, a thickness t1 is set at 50 nm, and an apex angle of the apex 7 where the optical near-field is generated is set at 40 degrees. A material of the scatterer 2 for generating the optical near-field is gold. The material of the scatterer may be any metals or alloys such as silver, copper, aluminum, iron or nickel, or a semiconductor such as Si as long as the material has conductivity.

Figure 3:
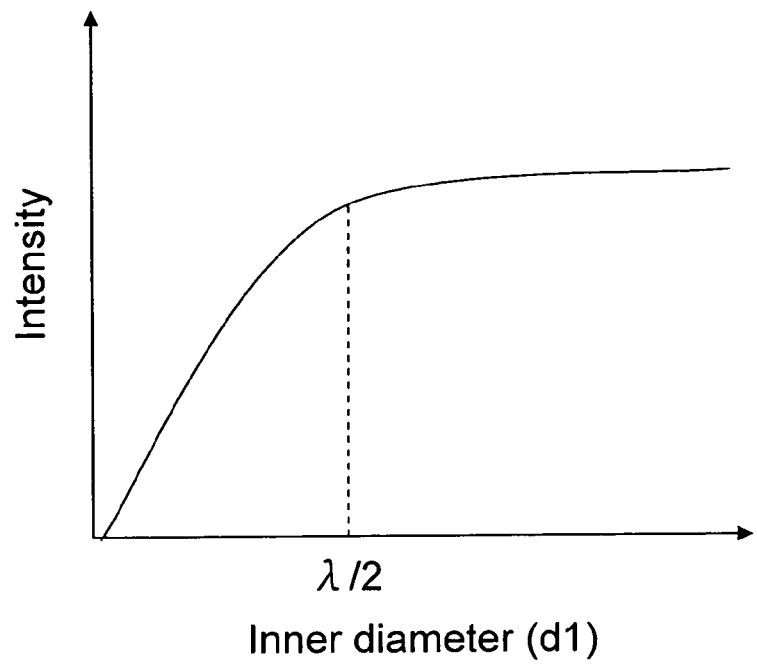
FIG. 3 is a graph showing a relation between an inner diameter of the coil and optical near-field intensity.

A portion of the inside of the coil 3 serves as a waveguide for the incident light. Therefore, as in the case of an optical waveguide, when a width d1 of the inside of the coil is set at an excessively small value, a mode of propagation to propagate light through the inside disappears, so that an amount of the light which reaches at the optical near-field generating element 2 is reduced. That is, as shown in FIG. 3, when the width d1 of the inside of the coil becomes not larger than a half of the wavelength ($\lambda$) of the incident light, a half of the wavelength ($\lambda/2$) being a cut-off diameter of the waveguide, it becomes difficult for the light to propagate through the inside of the coil, so that the amount of the light which reaches at the optical near-field generating element 2 is reduced. Accordingly, it is preferable that the width d1 of the inside of the coil is not smaller than a half of the wavelength of the light, which propagates through the inside of the coil. In the present embodiment, since the wavelength of the incident light is set at 780 nm (a wavelength in a vacuum), a value of a half-wavelength ($\lambda/2$) is obtained by the following equation: a wavelength in a vacuum divided by a refraction index (=1.5) of a material (quartz) of the inside of the coil divided by 2 (780 nm÷1.5÷2=260 nm). Accordingly, the width d1 of the inside of the coil is set at 300 nm (in a case where the coil is circular, d1 corresponds to an inner diameter of the coil).

To cause the intensity of the optical near-field to be the largest, it is preferable that the center of the above-described scatterer is substantially congruent with the coil center. For example, in the case of the present embodiment, it is preferable that the center of the scatterer (the center of a perpendicular drawn from the apex to the base) is substantially congruent with the coil center. However, in a case where the intensity of a magnetic field is needed to be increased at a point where the optical near-field is generated, it is preferable that the scatterer is placed so that the point where the optical near-field is generated is substantially congruent with the coil center. For example, in the case of the present embodiment, it suffices to set a distance x between the apex 7 and the coil at a half value of the width d1 of the inside of the coil, that is, 150 nm.

When the width w1 of the coil is excessively large, a current flows outside of the coil due to the skin effect. This corresponds to that the radius of curvature of the coil becomes large, and then the intensity of the magnetic field generated inside of the coil is decreased. To prevent this, it is preferable that the width w1 of the coil is smaller than a skin depth. Here, the skin depth δ is expressed by the following expression:

$$\sqrt{\frac{2}{\sigma\mu\omega}}$$

where σ denotes conductivity of the coil, μ denotes magnetic permeability, and ω denotes angular frequency of an alternating current flowing through the coil.

In the present embodiment, since the coil material is copper and a modulation frequency is set at 1 GHz, the skin depth is 2.09 μm. Therefore, the width w1 of the coil is set at 1 μm, which is not larger than the skin depth.

Figure 4:
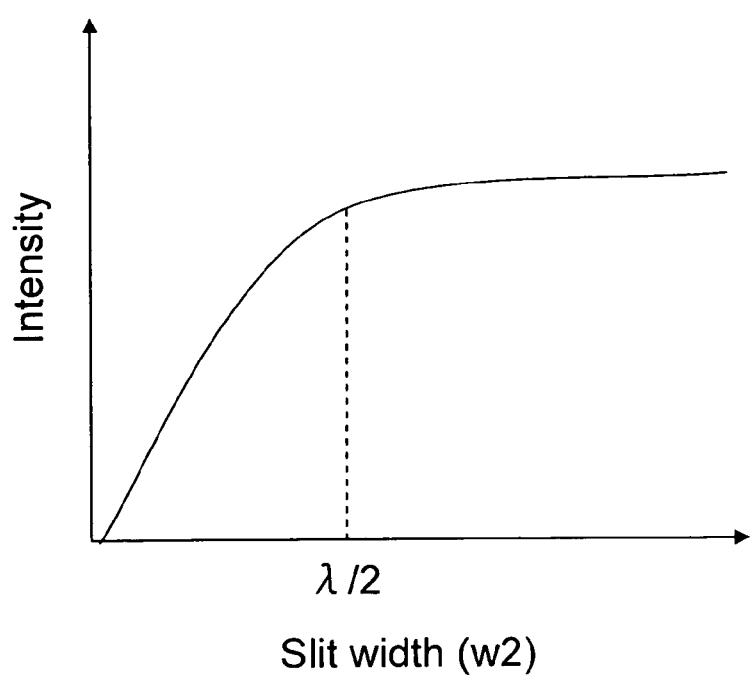
FIG. 4 is a graph showing a relation between an interval of leader lines and leaking-out-light intensity.

When an interval w2 of the slit 9 in a portion, where the leader lines 6 for conducting a current to the coil are attached, is caused to be excessively large, light leaks out of the slit portion and heats the medium. Though this slit has the same function as the slit-like waveguide, as in the case of the waveguide, as shown in FIG. 4, when the interval w2 becomes not smaller than the wavelength (λ) of the incident light, an amount of the leaking light becomes larger. Therefore, to reduce the heating by the light leaked from the slit portion, it is preferable that the width w2 of the slit is not larger than a half of the wavelength (λ) of the incident light. In the present embodiment, the width w2 is set at 50 nm. It should be noted that, as in the case of the slit-like waveguide, an amount of the light to be transmitted becomes the smallest when the direction of polarization becomes parallel to the slit 9 (the direction indicated by an arrow 8 in FIG. 2). Therefore, it is preferable that the incident light 4 is made incident in the direction of polarization of the light in parallel to the slit 9.

Figure 5:
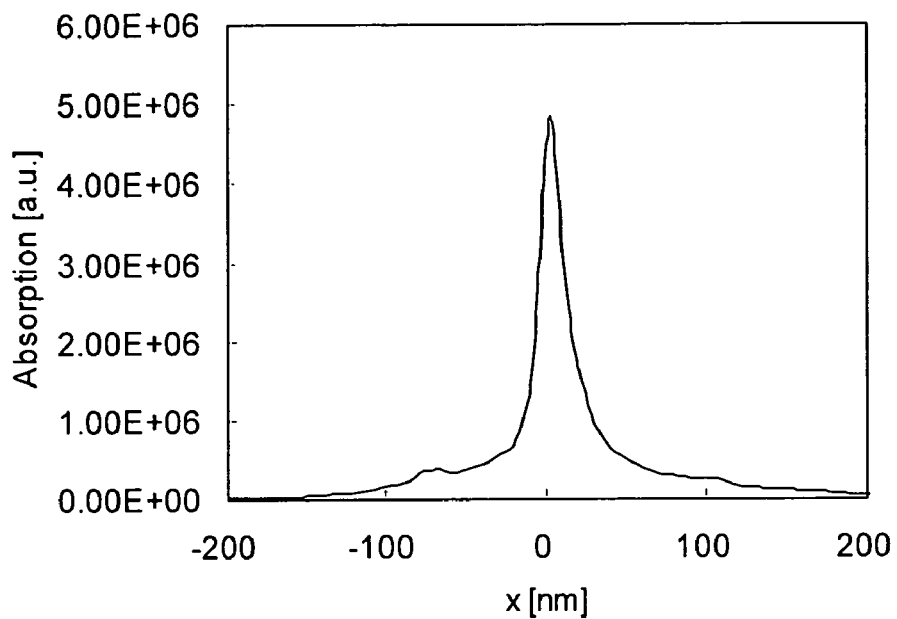
FIGS. 5A and 5B are distribution maps of absorption amounts on a medium surface.
Figure 5:
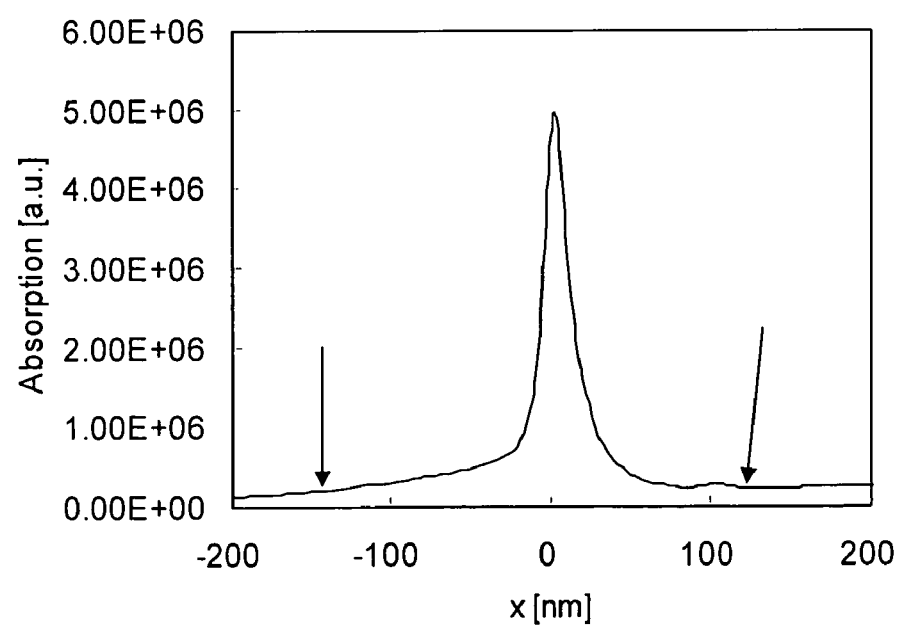

FIG. 5 shows distribution of light absorption on a medium surface when the above-described head is placed in the vicinity of the recording medium and light is irradiated. This distribution is calculated by using Finite Difference Time Domain (FDTD) method. A quartz substrate is used as a slider, and the circular coil shown in FIG. 2 is formed on the surface thereof. In the center of the coil, the metal scatterer being triangular in shape for generating the optical near-field is placed. A material of the metal scatterer is gold, and a width w3 is set at 100 nm, a thickness t1 is set at 50 nm, and an apex angle of the apex 7 where the optical near-field is generated is set at 40 degrees. A material of the coil is gold, a coil width w1 is set at 1 μm, and a coil thickness t2 is set at 800 nm. An interval of the slit 9 of the coil in a potion where the leader line 6 is attached is set at 50 nm. A Co medium with a thickness of 6 nm is used as a recording medium, and a distance between the slider and the medium is set at 8 nm. The incident light is a plain wave with a wavelength of 780 nm. FIGS. 5A and 5B show distributions of the amount of light absorption on the medium surface in a case where the coil is placed in the circumference of the scatterer and in a case where the coil is absent, respectively. As shown in FIGS. 5A and 5B, by forming the coil of the present invention, it is appreciated that the heating by the background light, which is indicated by arrows in FIG. 5B, is reduced.

Second Embodiment

Figure 6:
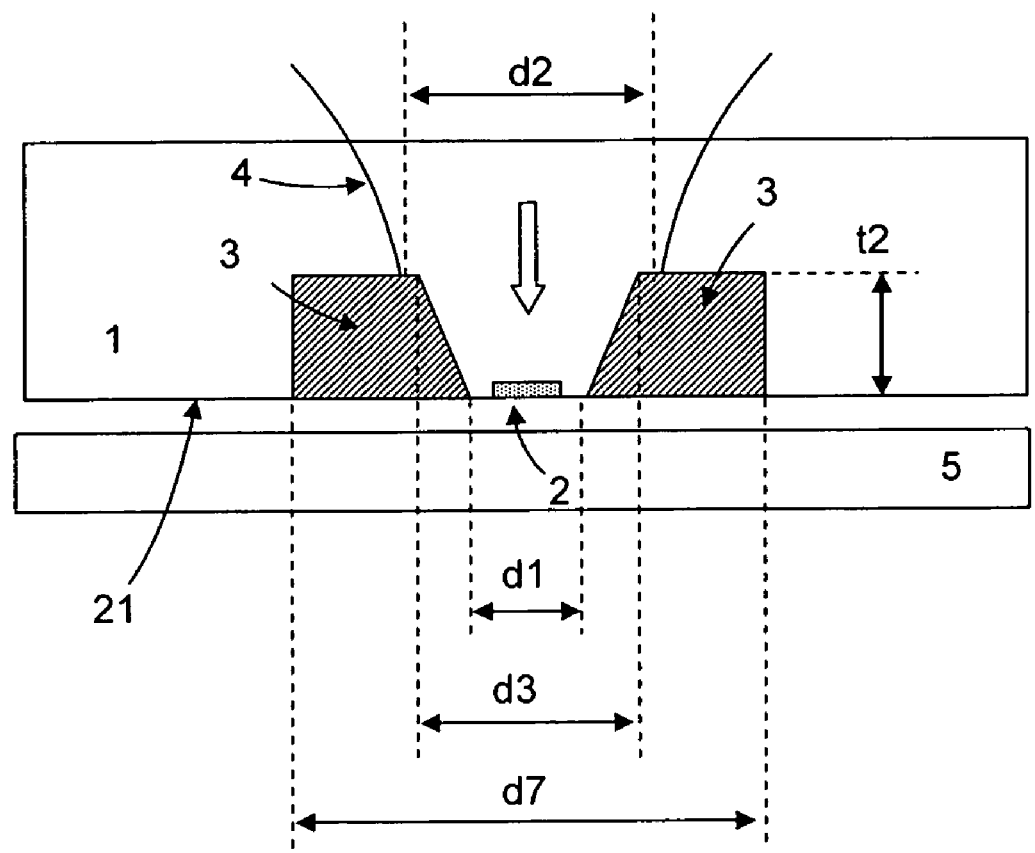
FIG. 6 is a cross-sectional view showing an example of the coil in which an inside diameter varies.

Next, an embodiment in a case where a width of the inside of the coil is varied in an upper side and a lower side will be described. In the above-described configuration, to improve utilization efficiency of light energy, as shown in FIG. 6, a width d3 of the inside of the coil in the upper side of the coil (the side where the light is made incident) is made larger than a width d1 of the inside of the coil in the lower side of the coil (the side where the light goes out). By doing so, a component of the incident light 4, which reflects without entering a hollow portion in the inside of the coil, becomes smaller, so that the light utilization efficiency is improved. In addition, as shown in FIG. 6, when a wall of the inside portion of the coil is tilted, the light irradiating the wall is reflected and concentrated in the center portion, so that energy density of the light incident on the metal scatterer 2 can be increased. That is, the coil 3 can be caused to have functions of guiding and condensing the light.

In the present embodiment, as in the case of the embodiment shown in FIG. 2, the coil 3 is circular in shape, and the metal scatterer 2 being triangular in shape for generating the optical near-field is placed in the center portion of the coil. A material of the coil 3 is copper, a coil thickness t2 is set at 1 μm, an outer diameter d7 of the coil is set at 2.3 μm, a width of the inside of the coil (an inner diameter) d1 in the lower side of the coil is set at 260 nm, a width d3 of the inside of the coil in the upper side of the coil is set at 500 nm, and a spot diameter d2 of the incident light is set at 1 μm. A material of the metal scatterer 2 for generating the optical near-field is gold, a width w3 is set at 100 nm, a thickness t1 is set at 50 nm, and an apex angle of the apex where the optical near-field is generated is set at 40 degrees. In the above-described configuration, the width d3 of the inside of the coil in the upper side of the coil may be the same as, or larger than, the spot diameter d2 of the incident light. By doing so, all the incident light 4 is made incident on the inside of the coil, so that the utilization efficiency of light can be further enhanced. For example, in the present embodiment, the coil thickness t2 is set at 1 μm, the inner diameter d1 of the coil in the lower portion of the coil is set at 260 nm, the inner diameter d3 in the upper portion of the coil is set at 1 μm, and the spot diameter d2 of the incident light is set at 1 μm.

Figure 7:
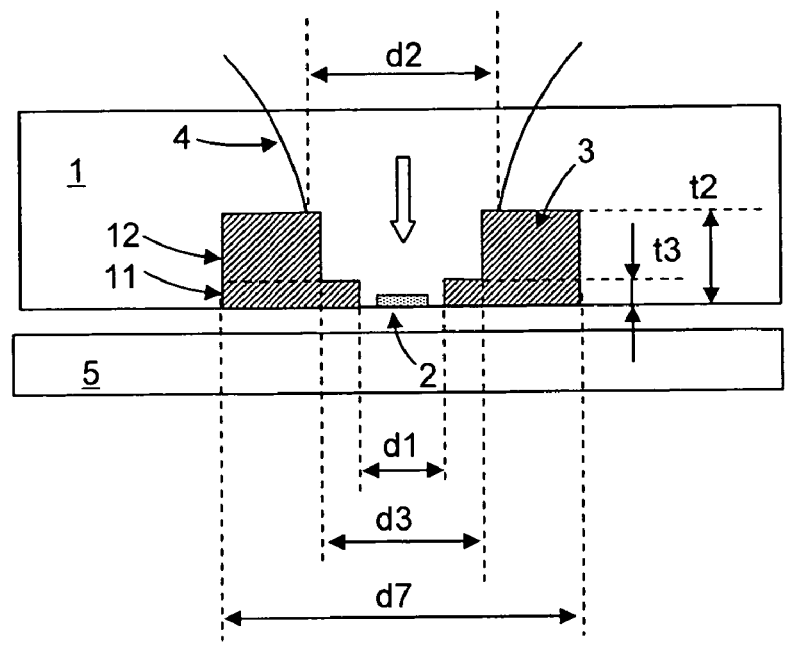
FIGS. 7A and 7B are cross-sectional views showing examples of the coils in which inside diameters vary stepwise.
Figure 7:
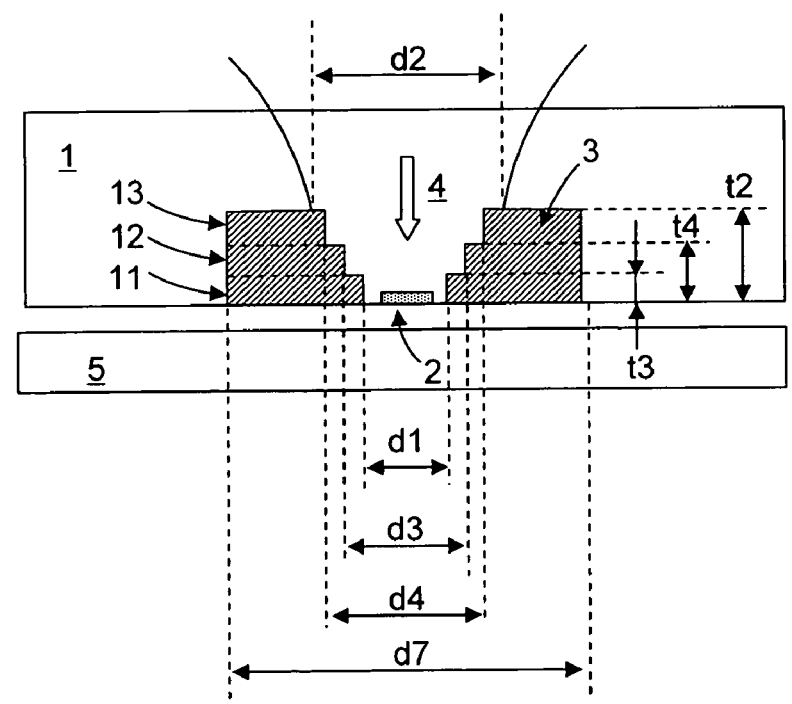

Moreover, instead of causing the inner wall to be tilted, as shown in FIG. 7, a width of the inside of the coil can be narrowed stepwise. In an embodiment of FIG. 7A, the coil is circular, and an inner diameter is changed in two stages. The inner diameter in a portion where a thickness is t3 (a layer denoted by reference numeral 11) is set at 260 nm, and an inner diameter in a portion thereabove (a layer denoted by reference numeral 12) is set at 500 nm. The thickness t3 is set at 100 nm, and a thickness t2 is set at 1 μm. An outer diameter d7 of the coil is set at 2.3 µm. In an embodiment of FIG. 7B, the coil is circular, and an inner diameter thereof is changed in three stages. An inner diameter in a portion where a thickness is t3=200 nm (a layer denoted by reference numeral 11) is set at 260 nm, an inner diameter of a portion where a thickness is up to t4=400 nm thereabove (a layer denoted by reference numeral 12) is set at 360 nm, and an inner diameter in a portion where a thickness is up to t2=600 nm thereabove (a layer denoted by reference numeral 13) is set at 460 nm. An outer diameter d7 of the coil is set at 2.3 µm.

Third Embodiment

Next, an embodiment in a case where the base of the coil is apart from the base of the slider will be described.

Figure 8:
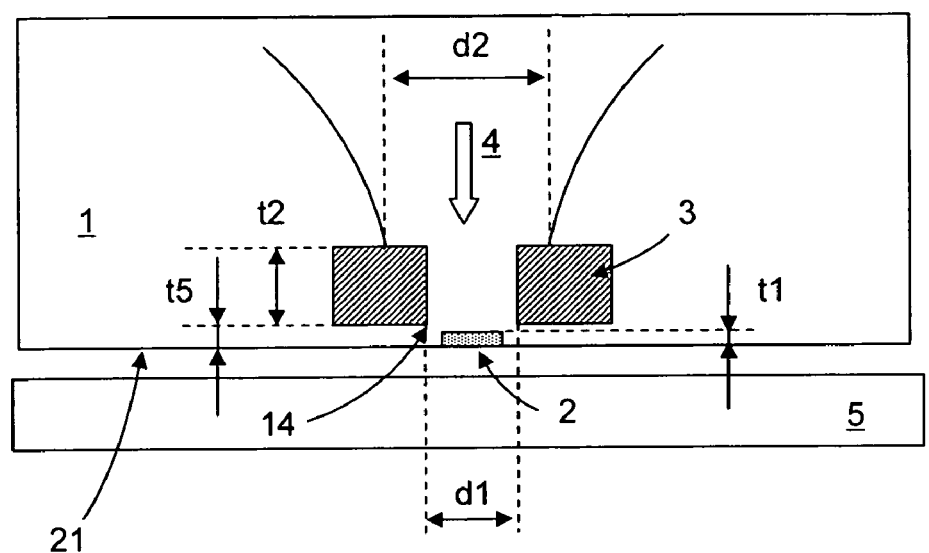
FIG. 8 is a cross-sectional view showing an example in which a base of the coil is apart from an air bearing surface of a slider.

The base of the coil 3 is not necessarily on a level with the base of the slider. As shown in FIG. 8, the coil may be placed so that a distance between the base of the coil 3 and a surface of the medium 5 becomes larger than a distance between an air bearing surface of the slider and the surface of the medium 5. In general, in a vicinity of an edge of a circular aperture, intensified scattered light (localized light) is generated, but similar scattered light is also generated in the vicinity of an edge 14 of the coil 3, which functions as a shading film. When the scattered light is absorbed in the medium, it causes expansion of a heating region. In contrast, as in the case of the above-described configuration, the base of the coil 3 is placed apart from the medium, so that the scattered light generated in the edge 14 becomes difficult to be absorbed in the recording medium 5. Thus, it becomes possible to narrow the heating region.

In the present embodiment, as in the case of the embodiment shown in FIG. 2, the coil 3 is circular in shape and the metal scatterer 2 being triangular in shape for generating the optical near-field is placed in the center portion of the coil. A material of the coil 3 is copper, a coil thickness t2 is set at 1 µm, a coil width w1 is set at 1 µm, an inner diameter d1 of the coil is set at 300 nm, an interval w2 of a slit of the coil in a portion where the leader lines are attached is set at 50 nm, and a distance t5 between the base of the coil and the air bearing surface 21 of the slider is set at 30 nm. A material of the metal scatterer 2 for generating the optical near-field is gold, a width w3 is set at 100 nm, a thickness t1 is set at 50 nm, and an apex angle of the apex 7 where the optical near-field is generated is set at 45 degrees. A spot diameter d2 of the incident light is set at 1 µm.

Fourth Embodiment

Next, an embodiment in a case where a width of the coil is partially narrowed will be described.

Figure 9:
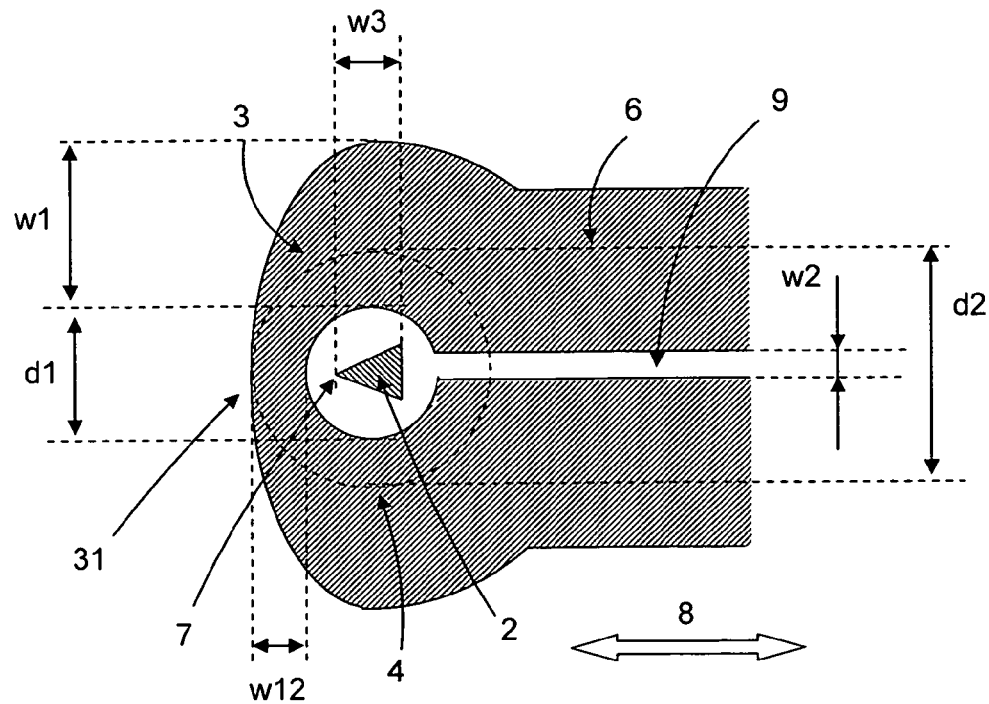
FIG. 9 is a view showing an example of the coil in which a width of wiring is partially narrowed.

A coil width w1 may be partially narrowed. FIG. 9 shows an embodiment in a case where a width of the coil 3 is narrowed in the vicinity of the apex 7 where the optical near-field of the scatterer 2 is generated. The inside of the coil 3 is circular in shape and the metal scatterer 2 being triangular in shape for generating the optical near-field is placed in the center portion of the coil. A material of the coil 3 is copper, an inner diameter d1 of the coil is set at 300 nm, a coil thickness t2 is set at 1 µm, and an interval w2 of a space 9 between the leader lines is set at 50 nm. A material of the metal scatterer 2 for generating the optical near-field is gold, a width w3 is set at 100 nm, a thickness t1 is set at 50 nm, and an apex angle of the apex 7 where the optical near-field is generated is set at 45 degrees. A width of the coil 3 is set at w1=1 µm in the vicinity of the leader lines, and at w12=300 nm in the vicinity of the apex 7 where the optical near-field is generated. A spot diameter d2 of the incident light 4 is set at 900 nm. In this manner, when a width of the coil is narrowed in the vicinity of the apex 7 where the optical near-field is generated, a current in the coil entirely flows inside the coil in a portion where the width is narrowed. Therefore, it is possible to increase the intensity of the magnetic field, which is generated in the vicinity of the apex 7 where the optical near-field is generated.

As described above, to prevent the light from leaking from the outside of the coil when a coil width is partially narrowed, it is necessary that an outside 31 of the narrowed portion should be caused to be an outside of a light spot 4. However, in a case where the narrowed portion is narrowed until the outside 31 becomes an inside of the light spot 4 in order to increase the intensity of the magnetic field, it is preferable that a width w12 of the narrowed portion is not larger than the half-wavelength of the light. That is, as shown in FIG. 10, it is preferable that a slit 32 with a width, which is not larger than the half-wavelength of the light, is formed in one portion of the coil.

Figure 10:
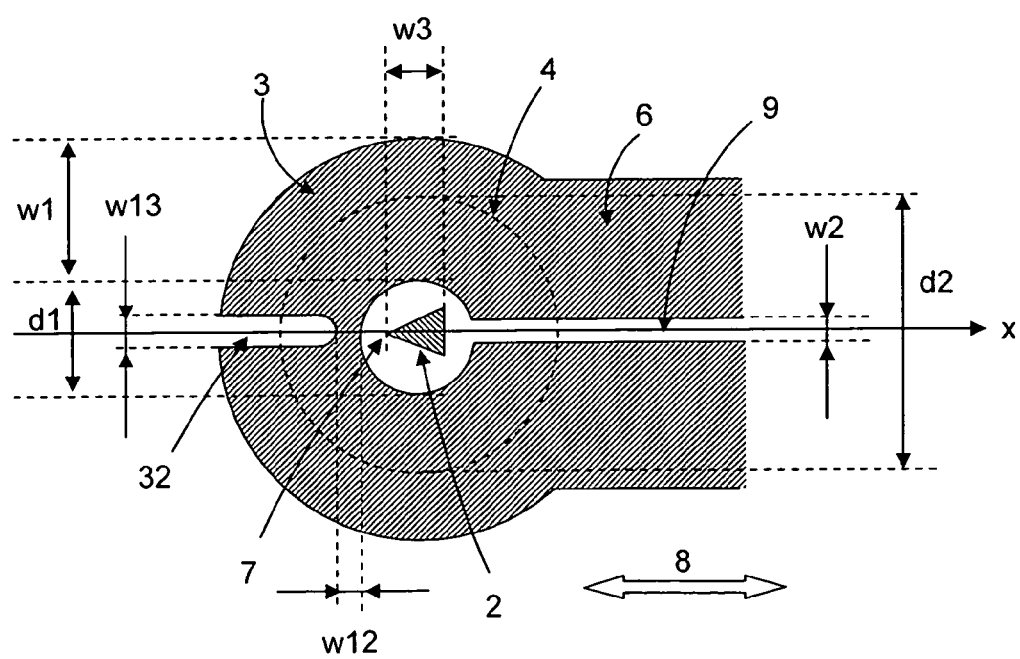
FIG. 10 is a view showing an example of the coil in which a slit is formed in one portion.

In the embodiment shown in FIG. 10, as in the case of the embodiment shown in FIG. 2, the coil 3 is circular in shape and the metal scatterer 2 being triangular in shape for generating the optical near-field is placed in the center portion of the coil. A material of the coil 3 is copper, a coil thickness t2 is set at 2 µm, an inner diameter d1 of the coil is set at 300 nm, an interval w2 of the slit 9 of the coil in the portion where the leader lines 6 are mounted is set at 50 nm, a coil width w1 is set at 1 µm, a coil width w12 of the narrowed portion is set at 100 nm, and a width w13 of the slit 32 in the narrowed portion is set at 100 nm. It should be noted that the above-described slit 32 may be formed in a plurality of portions on the coil. By narrowing the coil width in a plurality of portions, it is possible to cause a current to entirely flow through the inside of the coil. Therefore, it is possible to increase the intensity of the magnetic field which is generated in the inside of the coil.

Fifth Embodiment

Next, an embodiment in a case where a coil thickness is partially reduced will be described.

Figure 11:
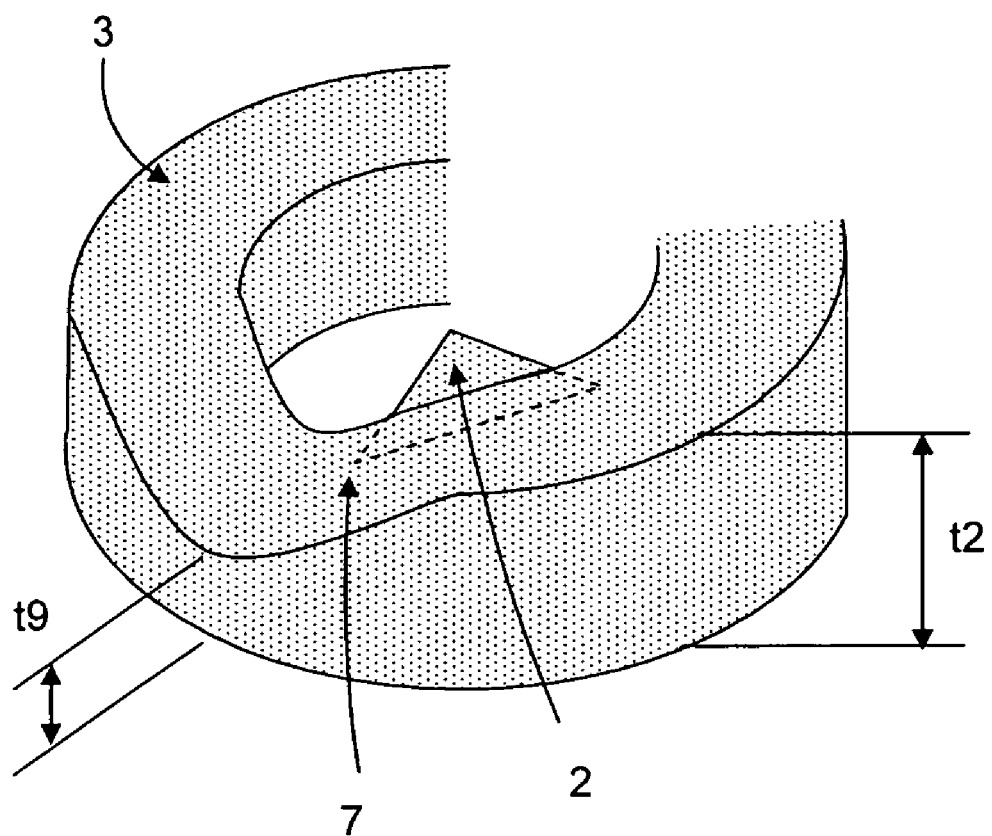
FIG. 11 is a view showing an example of the coil in which a thickness of wiring is partially reduced.

To increase the intensity of the magnetic field of the coil, as shown in FIG. 11, in the vicinity of a point where the optical near-field is generated, a coil thickness may be partially reduced. In the present embodiment, as in the case of the embodiment shown in FIG. 2, the coil 3 is circular in shape, and the metal scatterer 2 being triangular in shape for generating the optical near-field is placed in the center portion of the coil. A material of the coil 3 is copper, an inner diameter d1 of the coil is set at 300 nm, an interval w2 of the slit 9 of the coil in a portion where the leader lines are attached is set at 50 nm, and a coil width w1 is set at 1 µm. In addition, a total coil thickness t2 is set at 1 µm, and a coil thickness t9 is set at 500 nm in the vicinity of the apex 7 where the optical near-field is generated. Part of the current flowing through the coil flows through the upper side of the coil, but the magnetic field, which is formed by the portion, is weakened in the vicinity of the point 7 where the optical near-field is generated, because the upper side of the coil is apart from the point where the optical near-field is generated. In contrast, when a coil thickness is reduced in the vicinity of the point 7 where the optical near-field is generated, a current becomes to entirely flow through near the point 7 where the optical near-field is generated. Therefore, it is possible to increase the intensity of the magnetic field in the vicinity of the apex 7 where the optical near-field is generated. It should be noted that, in the present embodiment, the coil width is uniform, but as shown in FIG. 9, a coil width may be reduced when a coil thickness is partially reduced.

Sixth Embodiment

Next, an embodiment in a case where a curvature of the coil is partially reduced will be described.

Figure 12:
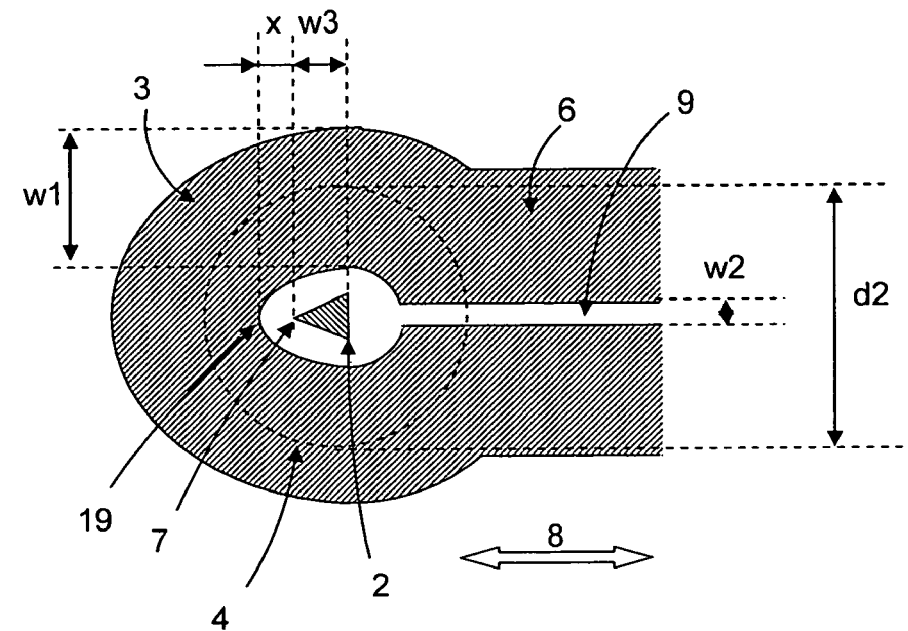
FIG. 12 is a view showing an example of the coil in which a curvature radius in one portion is smaller than in the other portion.

A shape of the coil may be, as shown in FIG. 12, a curved shape whose radius of curvature in one portion is reduced, instead of the shape being circular. The magnetic field generated in the vicinity of the coil becomes intensified as the coil curvature is reduced. Therefore, by reducing the radius of curvature of the coil in the vicinity of a point where the optical near-field is generated, it is possible to increase the intensity of the magnetic field in the point where the optical near-field is generated.

In the present embodiment, as shown in FIG. 12, a right half of the coil is circular with a radius of curvature of 150 nm in the inside of the coil, and a left half of the coil is circular with a radius of curvature of 50 nm in the inside of the coil. A material of the coil 3 is copper, a coil width is set at 1 µm, a coil thickness t2 is set at 800 nm, and an interval w2 of the space 9 between the leader lines is set at 50 nm. A material of the metal scatterer 2 for generating the optical near-field is gold, a width w3 is set at 100 nm, a thickness t1 is set at 50 nm, and an apex angle of the apex 7 where the optical near-field is generated is set at 40 degrees. Here, to maximize the intensity of the magnetic field at a point 7 where the optical near-field is generated, it is preferable that an equation $x<2r$ is established, when a radius of curvature of the inside of the coil at a portion 19 is r, and a distance between the point 7 and an inner wall of the coil in the portion 19 is x. Here, the radius of curvature of the coil is the smallest at the portion 19, and the optical near-field is generated at the point 7. In the present embodiment, the scatterer is placed so that the distance x becomes 50 nm.

Seventh Embodiment

Next, an embodiment in a case where a shape of the coil is different from a circle will be described.

Figure 13:
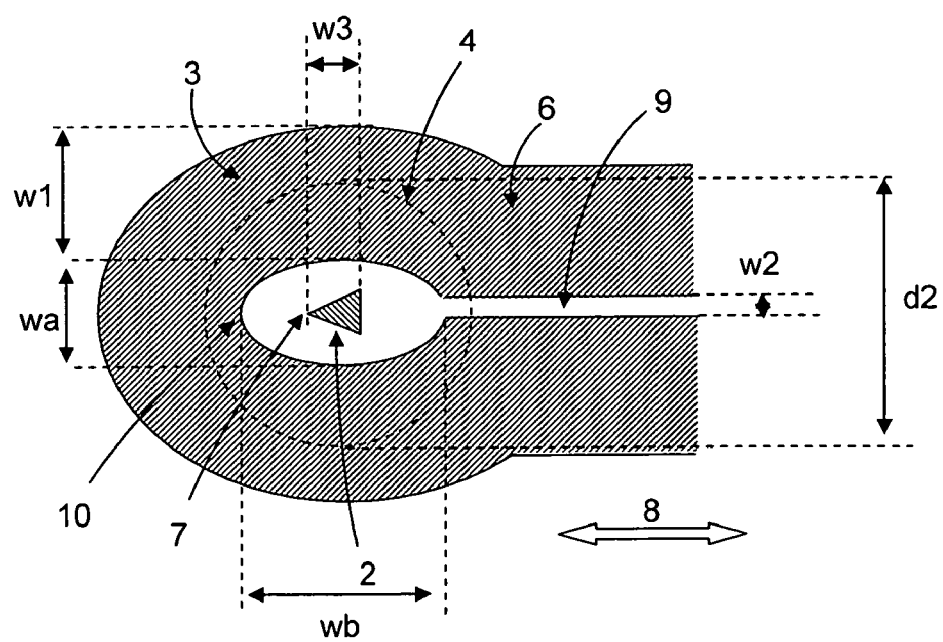
FIG. 13 is a view showing an example of a case where the coil is elliptical in shape.

The coil may be elliptical or polygonal in shape such as a triangle and a quadrilateral. FIG. 13 shows an embodiment in which the coil is elliptical in shape, and the metal scatterer being triangular in shape for generating the optical near-field is placed in the center of the coil. An aperture of the inside of the coil is elliptical in shape, where a length wb of a long axis is set at 500 nm and a length wa of a short axis is set at 300 nm. A material of the coil is copper, and a coil width is set at 1 µm, a coil thickness t2 is set at 700 nm, and an interval w2 of the space 9 between the leader lines is set at 50 nm. A material of the metal scatterer 2 for generating the optical near-field is gold, a width w3 is set at 100 nm, a thickness t1 is set at 50 nm, and an apex angle of the apex 7 where the optical near-field is generated is set at 40 degrees. The apex 7 where the optical near-field is generated is placed in order to face an apex 10 on the long axis of the ellipse, where a radius of curvature becomes the smallest so that the intensity of the magnetic field is increased at the apex 7.

Figure 14:
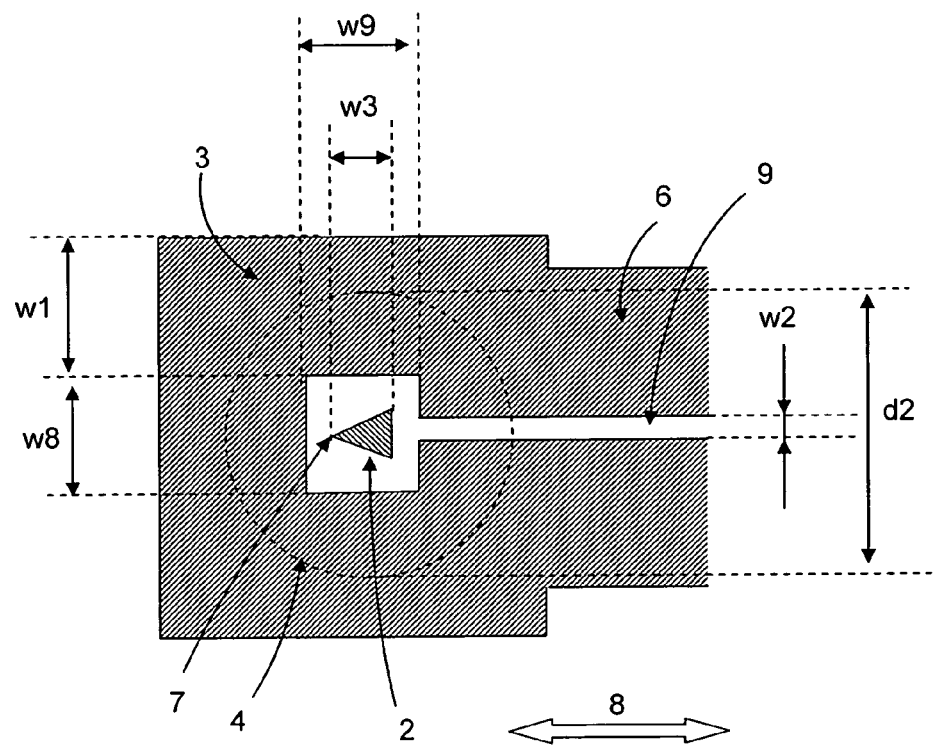
FIG. 14 is a view showing an example of a case where the coil is square in shape.

FIG. 14 shows an embodiment in a case where the coil is square in shape. In the present embodiment, the metal scatterer 2 being triangular in shape is placed in the center portion of the coil 3 being square in shape. A material of the coil 3 is copper, a coil width w1 is set at 1 µm, sizes w8 and w9 of an aperture in the center are set at 300 nm each, a coil thickness t2 is set at 1 µm, and an interval w2 of the space 9 between the leader lines is set at 50 nm. A material of the metal scatterer 2 is gold, a width w3 is set at 100 nm, a thickness t1 is set at 50 nm, and an apex angle of the apex 7 where the optical near-field is generated is set at 40 degrees. The light is made incident in a direction of polarization of the light, which is indicated by the arrow 8.

Figure 15:
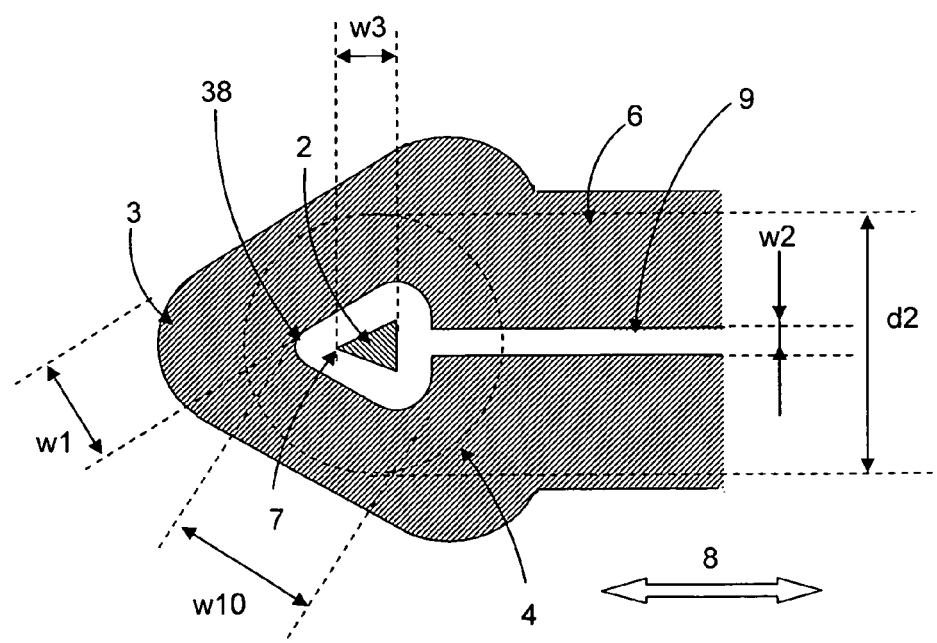
FIG. 15 is a view showing an example of a case where the coil is triangular in shape.

FIG. 15 shows an embodiment in a case where the coil is triangular in shape. In the present embodiment, the metal scatterer 2 being triangular in shape is placed in the center of the coil 3 being equilateral triangular in shape. A material of the coil 3 is copper, and a coil width w1 is set at 1 µm. The aperture in the center is also equilateral triangular in shape, and a length w10 of a side is set at 300 nm. A coil thickness t2 is set at 1 µm, and an interval w2 of the space 9 between the leader lines is set at 50 nm. A material of the metal scatterer 2 is gold, a width w3 is set at 100 nm, a thickness t1 is set at 50 nm, and an apex angle of the apex 7 where the optical near-field is generated is set at 60 degrees. In this coil, the magnetic field becomes intensified in a portion 38 where curvature of the inside of the coil becomes smaller. Therefore, the metal scatterer 2 is placed so that the apex 7 where the optical near-field is generated faces an apex 38 in order to generate the optical near-field in the vicinity of the apex 38. The light is made incident in a direction of polarization of the light, which is indicated by the arrow 8.

Eighth Embodiment

Next, en embodiment in a case where a shape of the scatterer is different from a triangle will be described.

Figure 16:
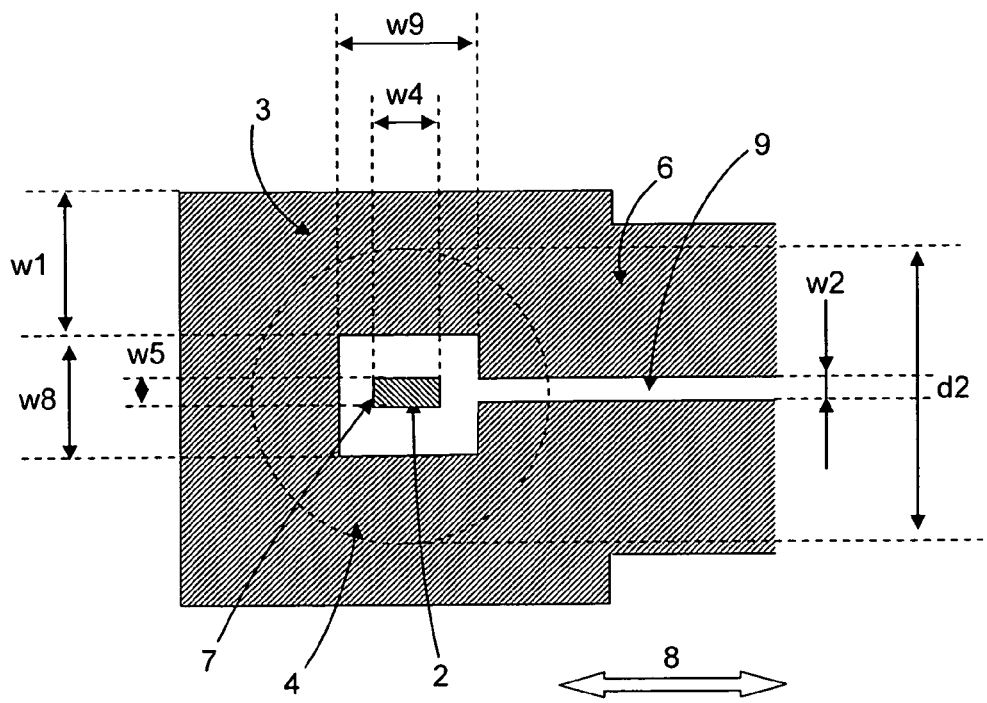
FIG. 16 is a view showing an example of a case where a scatterer is rectangular in shape.

The scatterer having conductivity for generating the optical near-field may be rectangular, circular, elliptical, spherical, conical or the like in shape, instead of being triangular in shape. FIG. 16 shows an embodiment in a case where the scatterer is rectangular in shape. The coil 3 is square in shape, and the metal scatterer 2 being rectangular in shape for generating the optical near-field is placed in the center portion of the coil. A material of the coil 3 is copper, and sizes w8 and w9 of the inside of the coil are set at 260 nm and 300 nm, respectively. A coil width w1 is set at 1 µm, a coil thickness t2 is set at 800 nm, and an interval w2 of the space 9 between the leader lines is set at 50 nm. It is preferable that a size of the metal scatterer 2 for generating the optical near-field is adjusted in order to generate plasmon resonance in a wavelength region of the incident light. In the present embodiment, a wavelength of the incident light is set at 780 nm, and a material of the scatterer 2 is gold. A direction of a long axis of the rectangle is a direction of polarization (a direction indicated by the arrow 8) in order that the plasmon resonance may be exited in the scatterer. Sizes are respectively set at w4=100 nm, w5=30 nm, and t1=50 nm.

Figure 17:
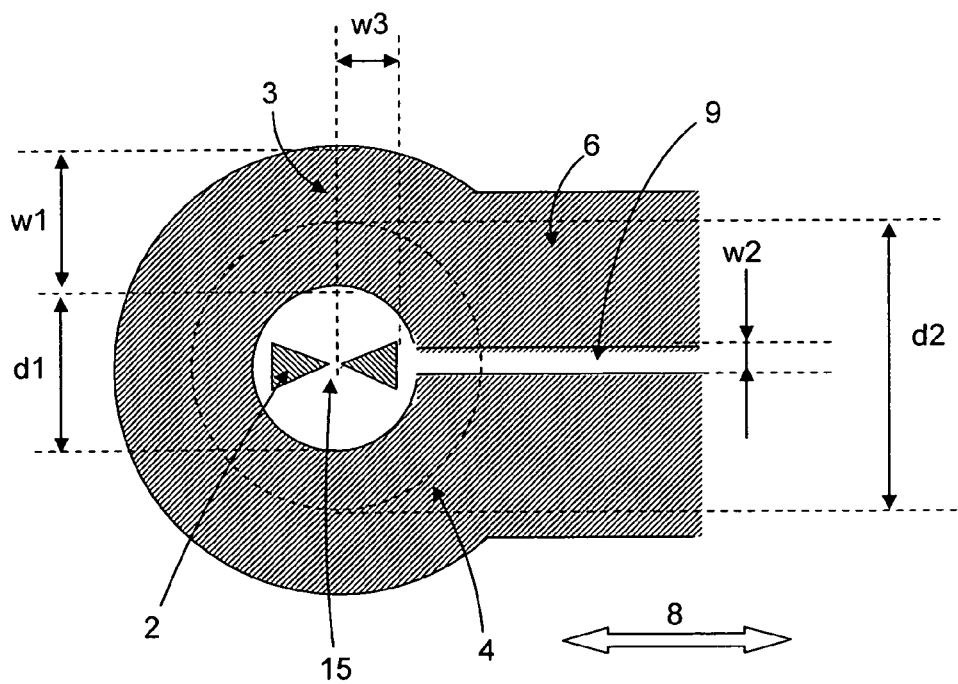
FIG. 17 is a view showing an example of a case where the scatterers are triangular in shape, the two scatterers being opposed to each other.

Two and more of the above-described conductive scatterers may be formed, instead of forming one. FIG. 17 shows an embodiment in which two triangular scatterers are placed in order to face one another. In this manner, the two triangular scatterers are placed so as to face one another, and the light is irradiated in a direction of polarization of the light, which is indicated by the arrow 8. As a result, an intensified optical near-field is generated in a space 15 between apexes of the two triangles. In this case, it is possible to generate a further intensified optical near-field by adjusting a length w3 of the triangles in order to generate plasmon resonance. In the present embodiment, a length w3 of the triangles is set at 100 nm, and an interval of the space 15 between the two apexes is set at 10 nm (a wavelength of the incident light is 780 nm). A thickness t1 of the scatterer is set at 50 nm. A material of the coil 3 is copper, an inner diameter d1 of the coil is set at 300 nm, a coil width w1 is set at 1 μm, a coil thickness t2 is set at 500 nm, and an interval w2 of the space 9 between the leader lines is set at 50 nm.

Ninth Embodiment

Next, an embodiment in a case where a scatterer comes in contact with the coil will be described.

The scatterer may be placed in contact with the coil. By placing the scatterer in contact with the coil, it is possible to reduce the background light leaking out of a space between the scatterer and the coil.

Figure 18:
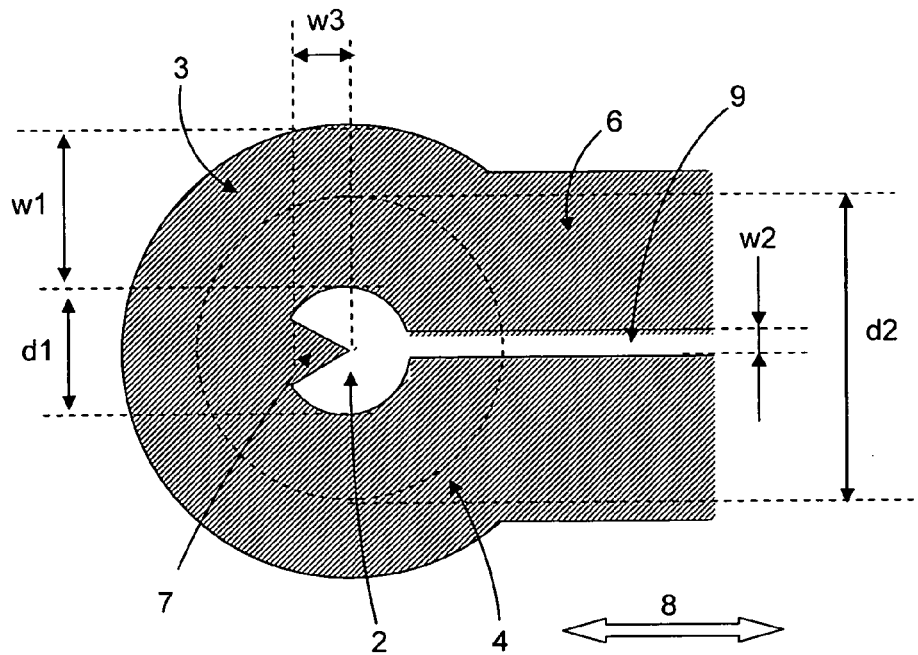
FIG. 18 is a view showing an example of a head in which the scatterer is triangular in shape and in which the scatterer is in contact with the coil.

FIG. 18 shows an embodiment in which the triangular scatterer 2 is placed in contact with the coil 3. A material of the coil 3 is copper, an inner diameter d1 of the coil is set at 300 nm, a coil width w1 is set at 1 μm, a coil thickness t2 is set at 800 nm, an interval w2 of the space 9 between the leader lines is set at 50 nm. A material of the scatterer 2 is gold, a width w3 is set at 100 nm, a thickness t1 is set at 50 nm, and an apex angle of the apex 7 where the optical near-field is generated is set at 60 degrees. A material of the coil may be the same as the material of the scatterer 2, and in the case of the above-described embodiment, a material of the coil may be gold. In addition, a thickness t1 of the metal scatterer 2 may be substantially equal to a coil thickness t2, and in the case of the above-described embodiment, a thickness t1 of the scatterer 2 may be set at 800 nm.

Figure 19:
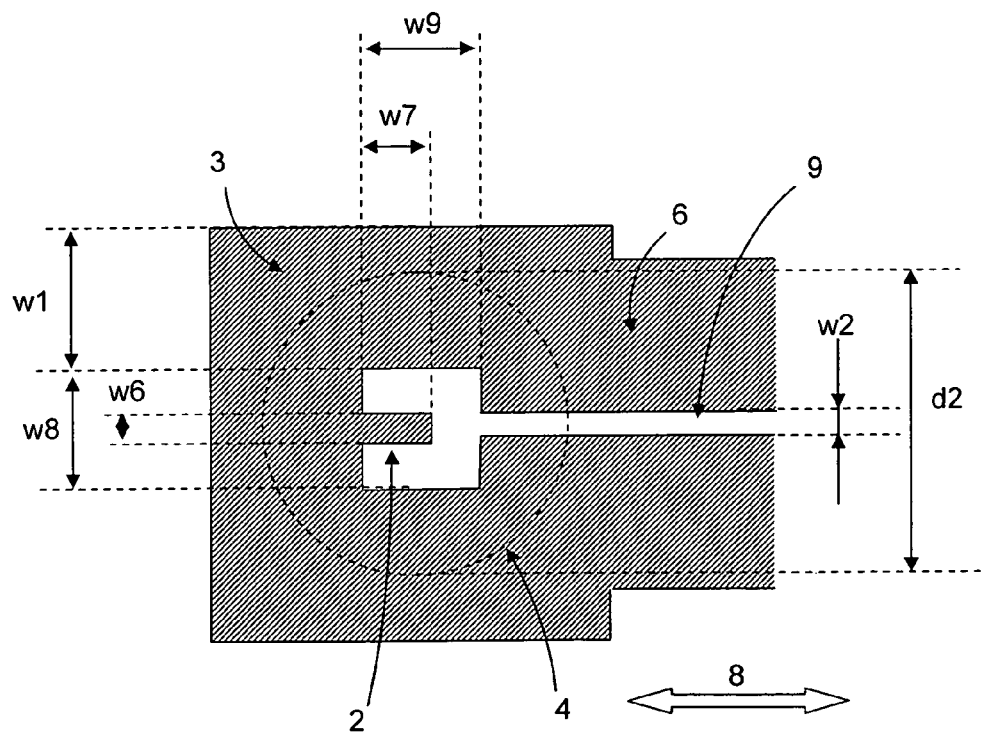
FIG. 19 is a view showing an example of the coil in which the scatterer is rectangular in shape and the coil is square in shape.

FIG. 19 shows an embodiment in a case where the scatterer 2 is rectangular in shape and is placed in contact with the coil 3. The coil 3 is square in shape and a material thereof is copper. A coil width w1 is set at 1 μm, sizes w8 and w9 of an aperture in the center are set at 300 nm each, a coil thickness t2 is set at 1 μm, and an interval w2 of the space 9 between the leader lines is set at 50 nm. A material of the metal scatterer 2 is gold, and sizes thereof are set at w7=100 nm, w6=30 nm, and t1=100 nm. The light is made incident in a direction of polarization of the light, which is a longitudinal direction of the rectangle (a direction indicated by the arrow 8). A material of the coil 3 may be the same as the material of the metal scatterer 2, and in the case of the above-described embodiment, a material of the coil may be gold. In addition, a thickness t1 of the metal scatterer 2 may be substantially equal to a thickness t2 of the coil 3, and in the case of the above-described embodiment, a thickness t1 of the scatterer 2 may be set at 1 μm. In addition, as described in a literature ("*JOURNAL OF APPLIED PHYSICS*", VOLUME 96, NUMBER 5, p. 2743), it is possible to further increase the intensity of the optical near-field by optimizing widths w9, w7, w6 and w8. In the case of the present embodiment, it is possible to generate a further intensified optical near-field by the following optimization: sizes of an aperture in the center and sizes of the scatterer are set at w8=218 nm, w6=19 nm, w7=18 nm, w9=38 nm and t1=60 nm, a coil width w1 is set at 1 μm, a thickness t2 is set at 1 μm, and an interval w2 of the space 9 between the leader lines is set at 50 nm.

Figure 20:
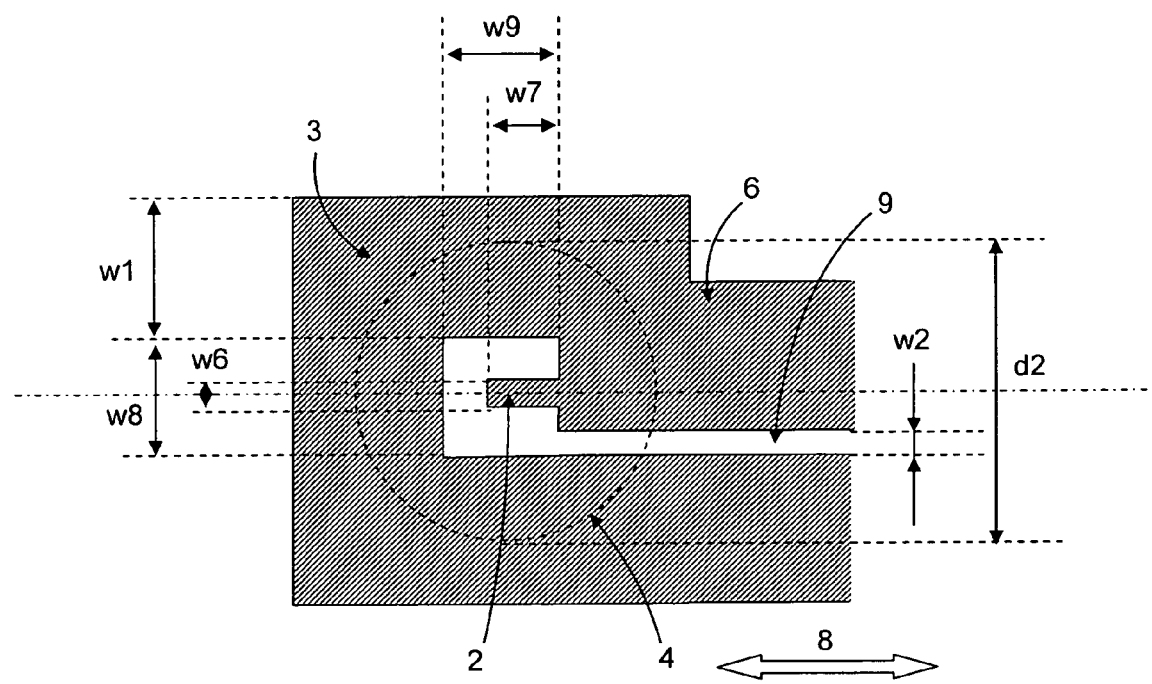
FIG. 20 is a view showing an example of the coil in which the scatterer is rectangular in shape and the coil is square in shape.

In addition, as shown in FIG. 20, the scatterer 2 may be placed near the leader line 6. In the present embodiment, the coil leader line 6 is placed being shifted from the center line, and the scatterer 2 is placed on the center line. A coil width w1 is set at 1 μm, sizes w8 and w9 of an aperture in the center are set at 300 nm each, a coil thickness t2 is set at 1 μm, and an interval w2 of the space 9 between the leader lines is set at 50 nm. A material of the metal scatterer is gold, and sizes thereof are set at w4=100 nm, w5=30 nm, and t1=100 nm.

Figure 21:
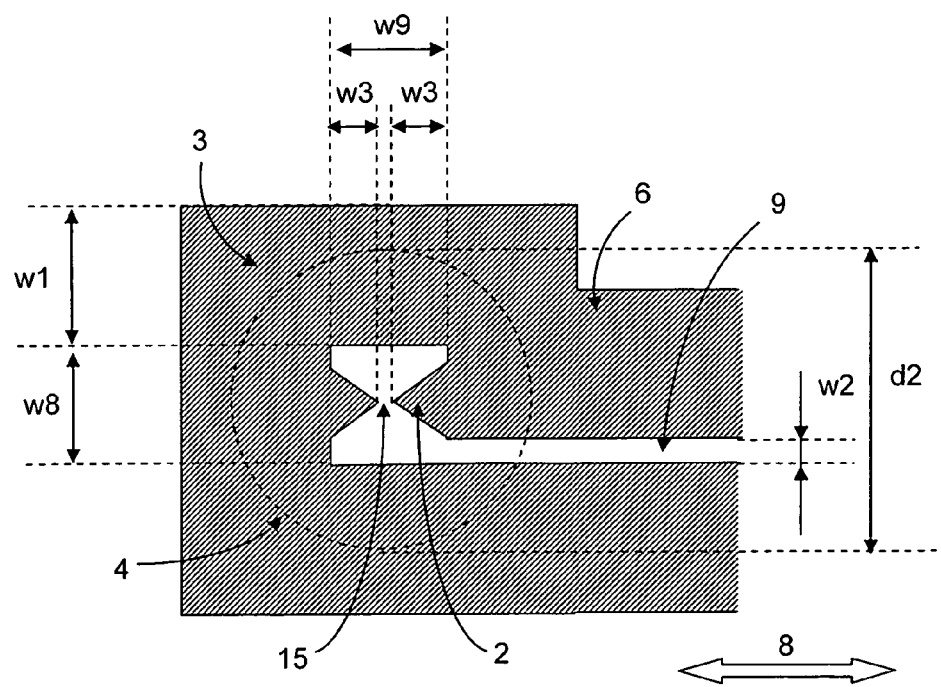
FIG. 21 is a view showing an example of the head in which the scatterers are triangular in shape, the two scatterers being opposed to each other, and being in contact with the coil.

FIG. 21 shows an embodiment in a case where two metal scatterers being triangular in shape are placed in contact with the coil 3. A length w3 of the triangle is set at 100 nm, and an interval of a space 15 between the two apexes is set at 10 nm. The light is made incident in a direction of polarization of the light, which is a direction indicated by the arrow 8. The coil 3 is square in shape, and a material thereof is copper. A coil width w1 is set at 1 μm, sizes w8 and w9 of an aperture in the center are set at 300 nm each, a coil thickness t2 is set at 1 μm, and an interval w2 of the space 9 between the leader lines is set at 50 nm. It should be noted that, in the embodiment of FIG. 21, both of the two scatterers are placed in contact with the coil 3, but only one of the scatterers may be placed in contact with the coil 3.

Tenth Embodiment

Next, a method of forming leader lines of the coil will be described.

Figure 22:
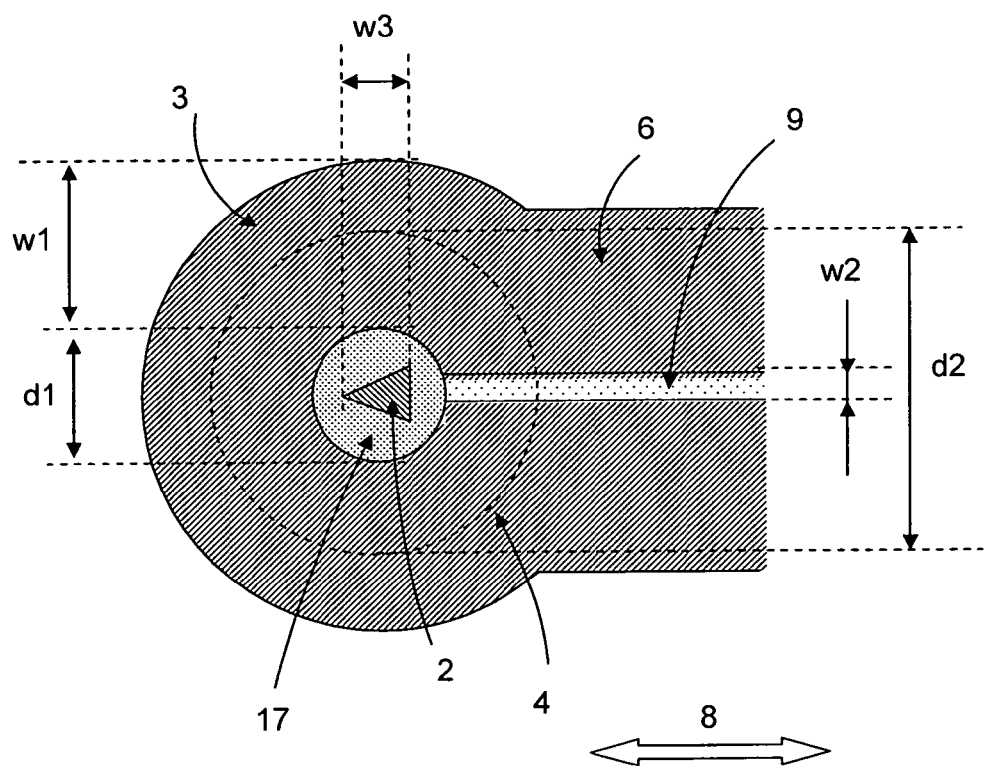
FIG. 22 is a view showing an example of the head in which the inside of the coil is filled with a high refraction material.

To further reduce the light leaking out of the space 9 between the two leader lines, which are connected to the coil, as shown in FIG. 22, a material of a coil center portion 17 of is made different from the material of the space 9 between the leader lines 6 of the coil, and a refraction index of the coil center portion 17 is made larger than a refraction index in a portion of the space 9 between the leader lines. By doing so, as in the case of the light waveguide, all the light reflects at a boundary between the coil center portion 17 and the portion of the space 9 between the leader lines. Accordingly, the light is blocked in the coil center portion, so that the light leaking out of the space 9 between the leader lines is further reduced. It should be noted that, in the upper side of the coil where the light is made incident, in order to prevent the light from being made incident into the space 9 between the leader lines, as shown in FIG. 6, it suffices to make a width of the inside of the coil larger in the upper portion, and to make a width d3 of the inside of the coil in the upper portion of the coil is substantially equal to, or larger than, a spot diameter d2 of the incident light.

In the present embodiment, the coil 3 is circular in shape, and a material thereof is copper. An inner diameter d1 in the lower portion of the coil and an inner diameter d3 in the upper portion of the coil are respectively set at 300 nm and 1 μm, an outer diameter of the coil is set at 2.5 μm, a coil thickness t2 is set at 1 μm, and an interval w2 of the space 9 between the leader lines is set at 100 nm. A material of the line is $SiO_2$, and a material of the coil center portion 17 is $Ta_2O_5$. The metal scatterer 2 for generating the optical near-field is placed in the center of the coil, and the scatterer is triangular in shape, a material thereof is gold, a width w3 is set at 100 nm, and a thickness t1 is set at 50 nm. A wavelength of the incident light 4 is set at 780 nm, and a spot diameter d2 is set at 1 μm. The center position of the incident light is made substantially congruent with the center of the coil 3 (the center of the scatterer 2). A material of the above-described center portion 17 may be $TiO_2$, SiN, Ti-doped $SiO_2$, Ge-doped $SiO_2$ or the like as long as a refraction index of the material is larger than a refraction index of the material of the space 9 between the leader lines.

Figure 23:
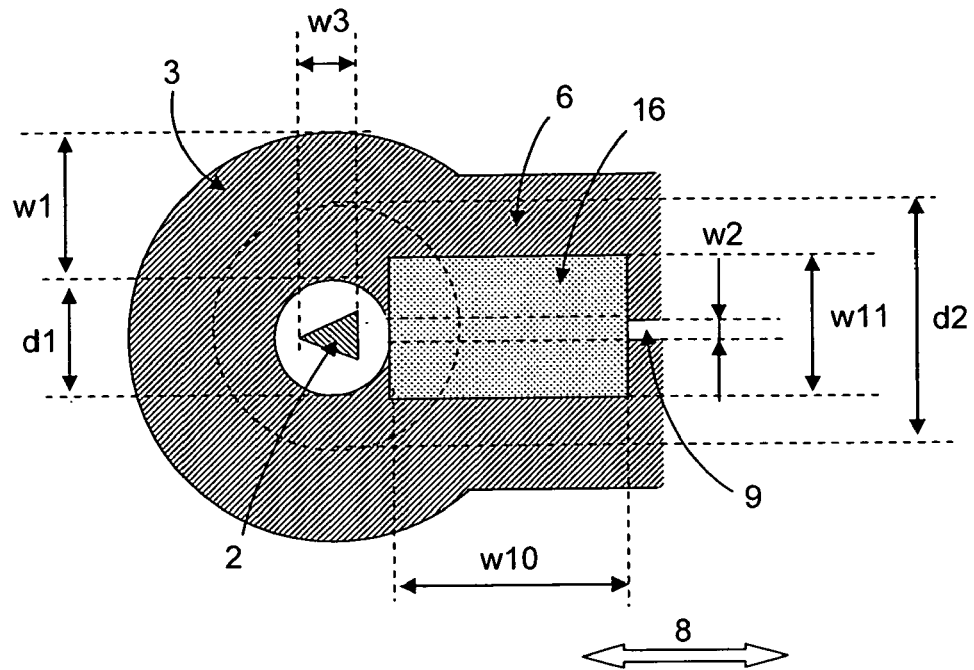
FIGS. 23A and 23B are views showing examples of the head in which a shading film is formed.
Figure 23:
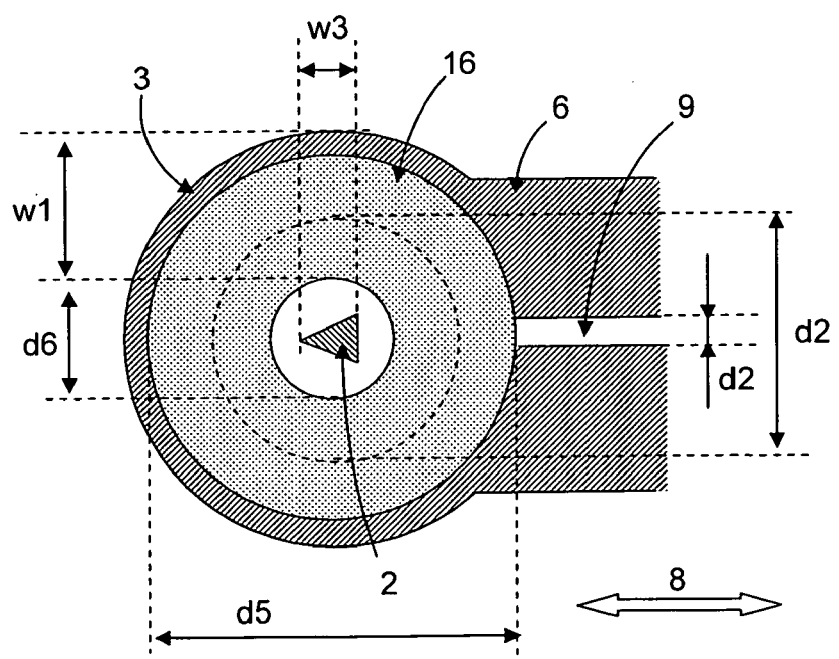
Figure 24:
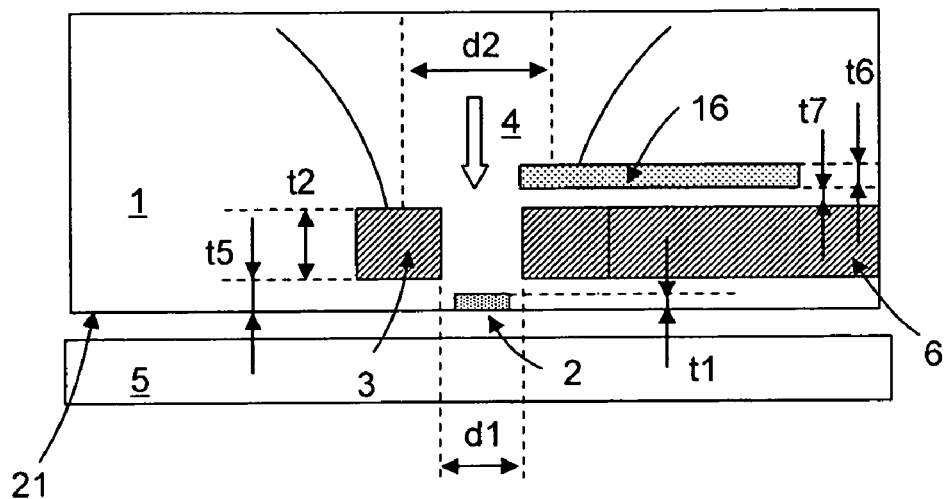
FIGS. 24A and 24B are views showing examples of the heads on which the shading film is formed.
Figure 24:
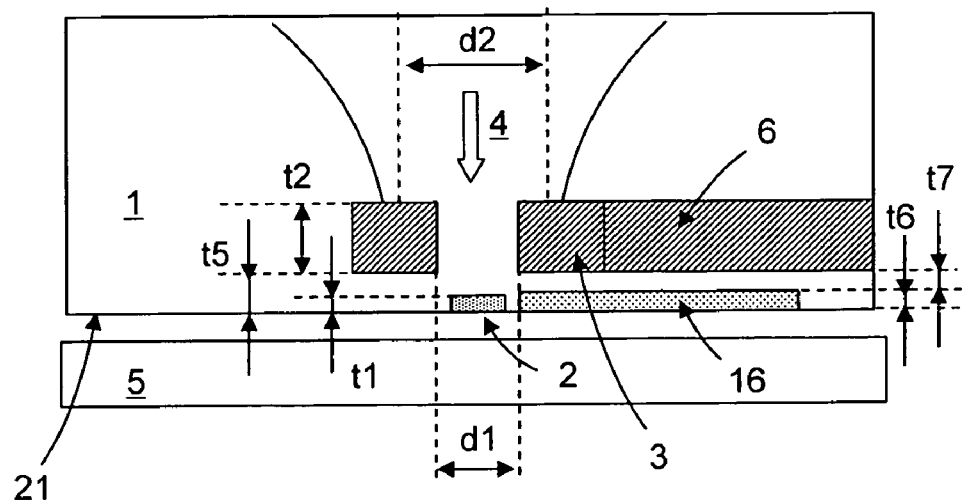

As a method of reducing the light leaking out of the space 9 between the leader lines, a film having shading performance may be formed on a portion of the leader lines 6 on the upper surface of the coil. Here, the film having shading performance means a film whose permeability for the incident light is not more than 50%. FIG. 23A shows an embodiment in which a shading film 16 is formed on the upper portion of the space 9 between the leader lines. The coil 3 is circular in shape, and the metal scatterer 2 being triangular in shape for generating the optical near-field is placed in the center portion of the coil. A material of the coil 3 is copper, an inner diameter d1 of the coil is set at 300 nm, a coil width w1 is set at 1 µm, a coil thickness t2 is set at 1 µm, and an interval w2 of the space 9 between the leader lines is set at 100 nm. A material of the metal scatterer 2 for generating the optical near-field is gold, a width w3 is set at 100 nm, and a thickness t1 is set at 50 nm. As a shading film 16, a film of gold being square in shape is used, a width w10 is set at 1 µm, a width w11 is set at 300 nm, and a thickness (t6 in FIG. 24A) is set at 100 nm. In a case where the shading film 16 has conductivity, when the shading film is placed in contact with the coil 3, a short circuit is caused. To prevent this, as shown in FIG. 24A, it suffices to place the shading film apart from the upper surface of the coil. In the present embodiment, an interval t7 between the upper surface of the coil and the shading film 16 is set at 100 nm, and a material between the upper surface of the coil and shading film is $SiO_2$. A wavelength of the incident light 4 is set at 780 nm, and a spot diameter d2 is set at 1 µm. The center position of the incident light is made substantially congruent with the center of the coil (the center of the scatterer 2). The light is made incident in a direction of polarization, which is a direction indicated by the arrow 8. Instead of the film made of gold, the shading film 16 may be made of any metals such as silver, copper, aluminum or carbon, or a semiconductor such as Si, or a dielectric such as photoresist as long as the material has shading performance.

In addition, the shading film may be formed so as to encircle an aperture of the coil center. FIG. 23B shows an example in which a circular shading film 16 is formed in the circumference of the aperture of the coil center. A material of the shading film 16 is aluminum, an outer diameter d5 is set at 2 µm, and an inner diameter d6 is set at 300 nm, which is equal to the inner diameter d1 of the coil. A thickness t6 of the shading film is set at 100 nm, and an interval t7 between the shading film and the upper surface of the coil is set at 50 nm. A wavelength of the incident light 4 is set at 780 nm, and a spot diameter d2 is set at 1 µm. The center position of the incident light is made substantially congruent with the center of the coil 3 (the center of the scatterer 2). Shapes of the coil and the scatterer are the same as the case of the above-described square shading film.

It should be noted that the shading film 16 may be placed on the lower side of the coil (a side close to the recording medium 5), as shown in FIG. 24B. In the present embodiment, shapes of the coil 3 and the metal scatterer 2 are the same as those of the embodiment shown in FIG. 24A, and a shading film 16 being square in shape, which is the same as that of FIG. 24A, is placed on the lower side of the leader lines 6. A distance t7 between the coil 3 and the base of the slider is set at 100 nm, a material of the shading film is gold, and a thickness of the shading film is set at 50 nm.

Figure 25:
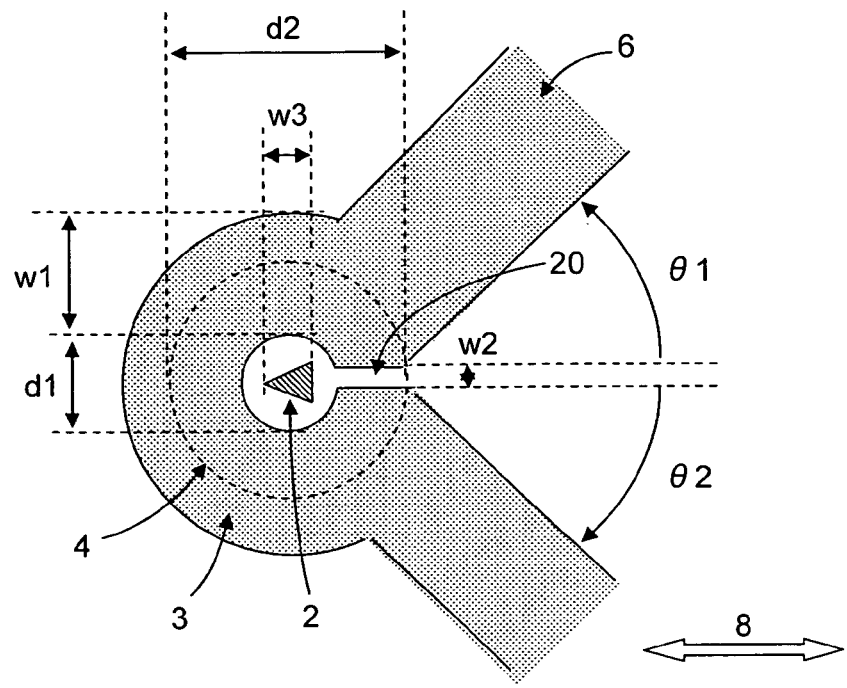
FIGS. 25A and 25B are views showing examples of the heads in which two leader lines are nonparallel.
Figure 25:
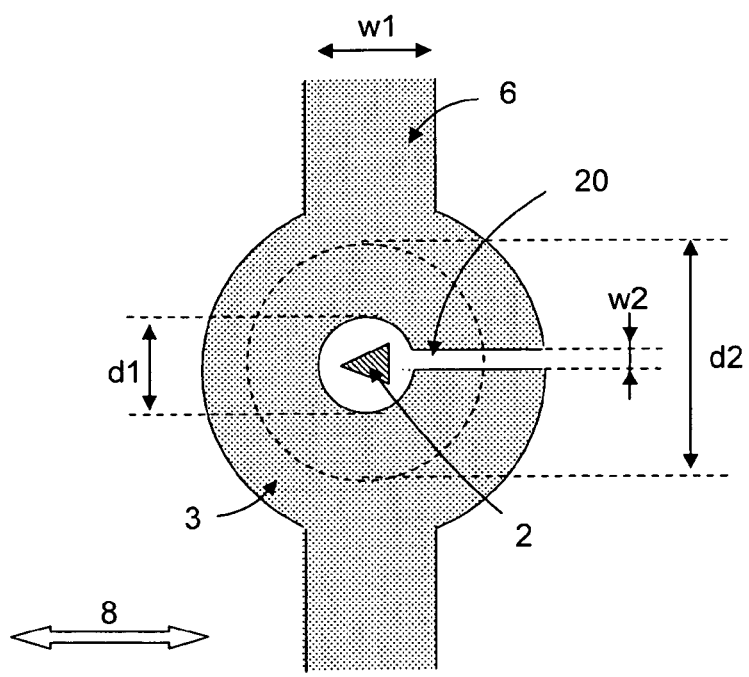

As shown in FIGS. 25A and 25B, the space between the leader lines 6 may be formed in a way that the leader lines are apart from one another in portions apart from the coil. As in the case of FIG. 2, when the two leader lines 6 are placed in parallel, if a coil current is modulated to a high speed, the space 9 between the leader lines serves as a capacitor, and there is a possibility that a leak current flows through the space 9 between the two leader lines. As shown in FIGS. 25A and 25B, it s possible to prevent this by separating the two leader lines 6 from one another. FIG. 25A shows an embodiment in which an angle θ1 formed by the two leader lines 6 is larger than 0 degree. The coil 3 is circular in shape, and the metal scatterer 2 being triangular in shape for generating the optical near-field is placed in the center portion of the coil. A material of the coil 3 is copper, an inner diameter d1 of the coil is set at 300 nm, a coil width w1 is set at 1 µm, a coil thickness t2 is set at 1 µm, and an interval w2 of a slit 20 of the coil is set at 50 nm. A material of the metal scatterer 2 for generating the optical near-field is gold, a width w3 is set at 100 nm, and a thickness t1 is set at 50 nm. A spot diameter d2 of the incident light is set at 1 µm, and a direction of the polarization is a direction indicated by the arrow 8. The leader lines 6 of the coil 3 are tilted in an outside portion of an incident light spot 4, and respective angles θ1 and θ2 are set at 45 degrees. The angles θ1 and θ2 may be formed to be θ1=θ2=90 degrees as long as the angles are not less than 0 degree. In addition, the angles θ1 and θ2 may be different from one another, and for example, the angles may be formed to be θ1=90 degrees and θ2=0 degrees. In addition, as shown in FIG. 25B, the leader lines 6 of the coil may be formed in portions apart from the slit 20 of the coil.

Figure 26:
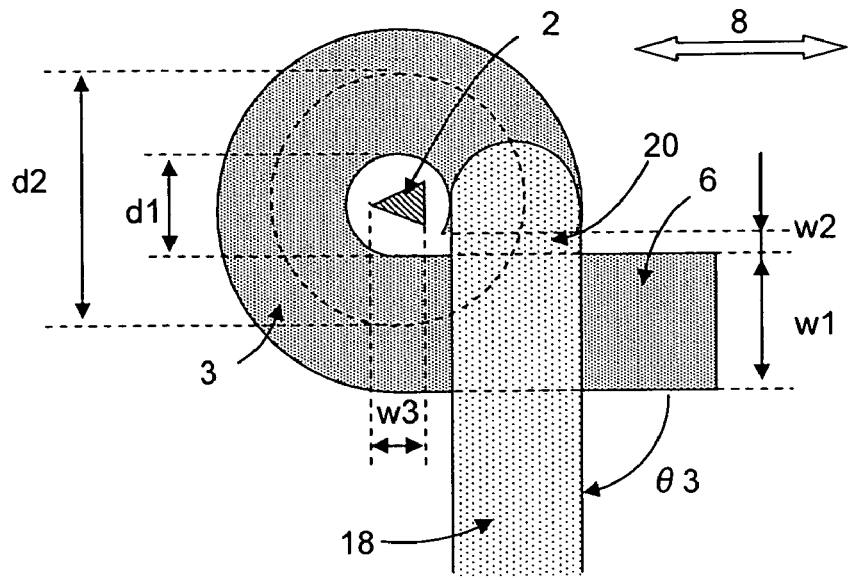
FIGS. 26A and 26B are views showing examples of the heads in a case where the leader lines are placed to be intersectional.
Figure 26:
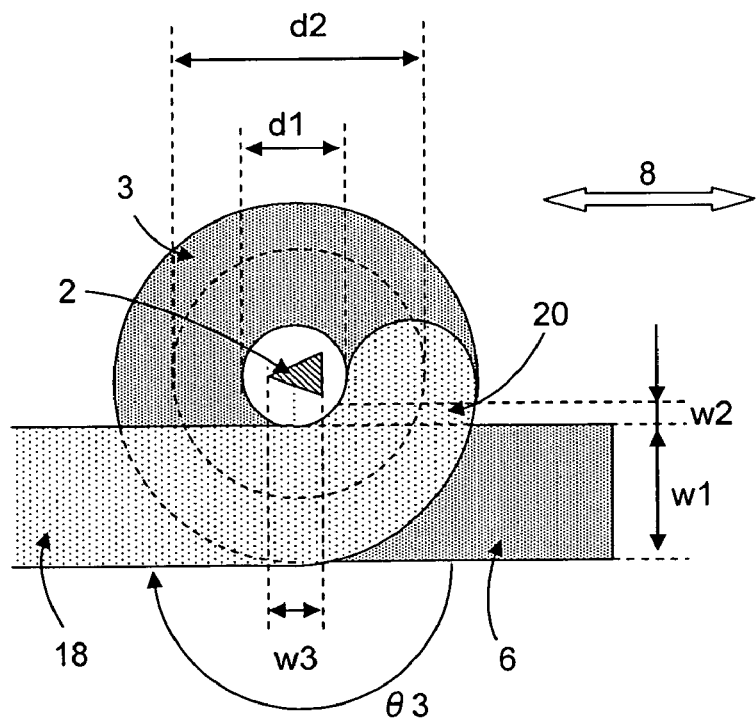

The leader lines of the coil may be crossed each other by changing the heights of the leader lines (the distances from the air bearing surface 21 of the slider). FIG. 26A shows an embodiment in a case where the two leader lines are placed so that an angle θ3 formed by each other becomes 90 degrees. The coil 3 is circular in shape, and the metal scatterer 2 being triangular in shape for generating the optical near-field is placed in the center portion of the coil. A material of the coil 3 is copper, an inner diameter d1 of the coil is set at 300 nm, a coil width w1 is set at 1 µm, a coil thickness t2 is set at 1 µm, and an interval w2 of the slit 20 of the coil is set at 50 nm. A spot diameter d2 of the incident light is set at 1 µm, and a direction of the polarization is a direction indicated by the arrow 8. A leader line 18 in one side (in a side which is far from the air bearing surface 21) is placed above the other leader line 6, and a distance between a lower surface of the leader line 18 and an upper surface of the leader line 6 is set at 100 nm. It should be noted that an angle θ3 formed by the above-described leader lines may be set at an arbitrary value, and the angle may be θ3=180 degrees as shown in FIG. 26B.

Eleventh Embodiment

Next, an embodiment in a case where a winding number of the coil is two and more will be described.

Figure 27:
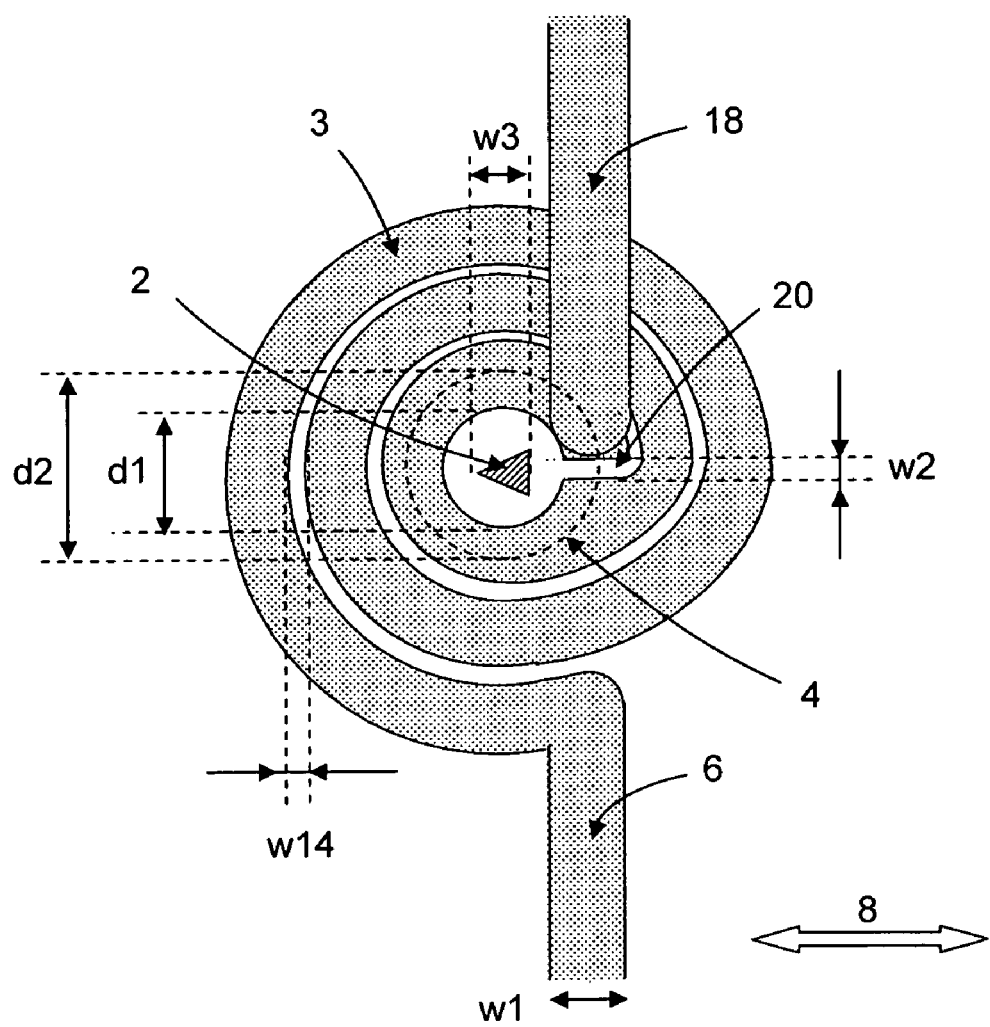
FIG. 27 is a view showing an example of the head in which a winding number of the coil is larger than one.

A winding number of the coil may be more than one in order to increase the intensity of the magnetic field. FIG. 27 shows an embodiment in a case where a winding number is three. The coil 3 is circular in shape, and the metal scatterer being triangular in shape for generating the optical near-field is placed in the center portion of the coil. A material of the coil 3 is copper, an inner diameter d1 of the coil is set at 300 nm, a coil width w1 is set at 1 µm, a coil thickness t2 is set at 1 µm, an interval w2 of the slit 20 of the coil is set at 250 nm, and an interval w14 of adjacent wiring is set at 100 nm. A spot diameter d2 of the incident light 4 is set at 1 µm, and a direction of the polarization is a direction indicated by the arrow 8. The leader line 18 in one side of the coil is placed above the coil 3 and the line 6.

Figure 28:
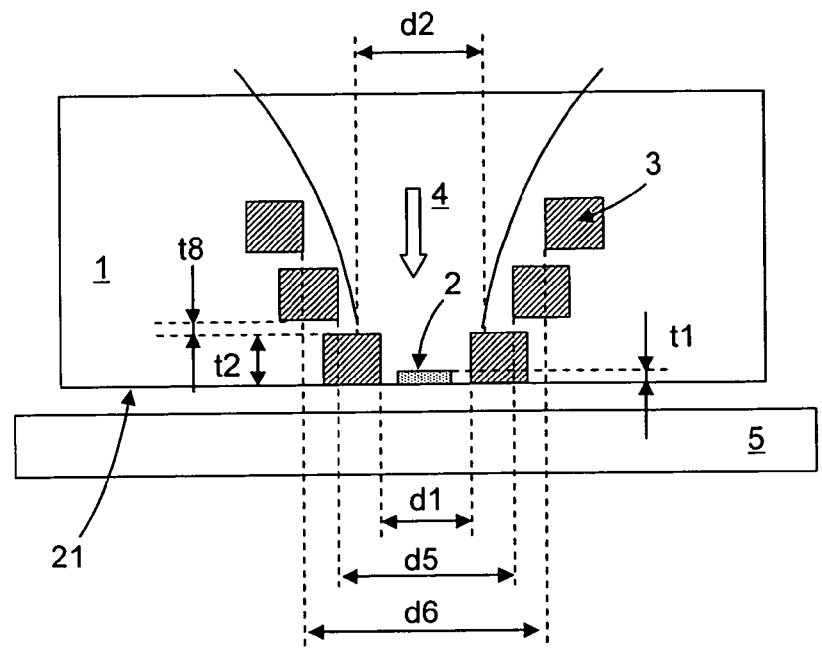
FIG. 28 is a view showing an example of the head in which a winding number of coil is larger than one and in which the coil is stacked in a direction vertical to the air bearing surface.

In a case where a winding number of the coil is larger than one, coil wiring may be stacked in a direction vertical to the air bearing surface of the slider. FIG. 28 shows an embodiment in which coil wiring is stacked for three layers in a direction vertical to the air bearing surface of the slider. The coil 3 is circular in shape, which is the same as the coil in FIG. 2, and the metal scatterer being triangular in shape for generating the optical near-field is placed in the center portion of the coil. A material of the coil 3 is copper, a coil width w1 is set at 1 µm, a coil thickness t2 is set at 1 µm, and an interval t8 between the coils is set at 100 nm. Inner diameters d1, d5 and d6 of the coil in each layer may be uniform, but to prevent the incident light 4 from being blocked by an upper side of the coil, it is preferable that the inner diameter becomes gradually larger toward the upper side. In the present embodiment, an inner diameter d1 on the lowermost side (the closest to the air bearing surface 21) is set at 300 nm, an inner diameter d5 in the second layer is set at 1 μm, and an inner diameter d6 in the third layer is set at 2 μm.

Twelfth Embodiment

Next, an embodiment of an entire optical system will be described.

Figure 29:
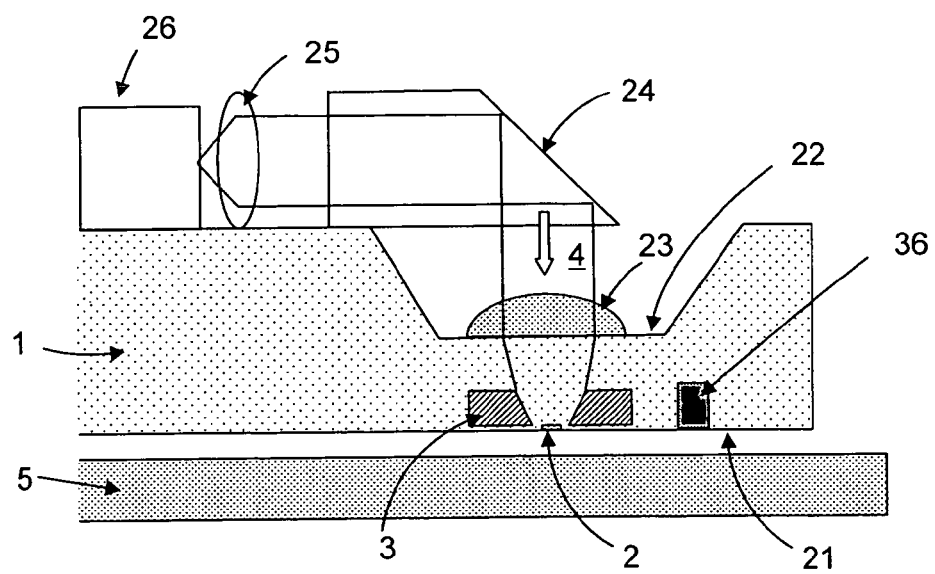
FIG. 29 is a view showing an example of an optical system of the recording head of the present invention.

FIG. 29 shows an embodiment of an entire optical system for recording. The optical near-field generating element 2 and the coil 3 are formed to be embedded in the air bearing surface 21 of the slider. As in the case of the embodiment shown in FIG. 2, the coil 3 is circular in shape, and the metal scatterer 2 being triangular in shape for generating the optical near-field is placed in the center portion the coil. A material of the coil 3 is copper, a coil width w1 is set at 1 μm, a coil thickness t2 is set at 1 μm, and an interval w2 between the leader lines is set at 50 nm. As in the case of FIG. 6, an inner diameter of the coil becomes gradually larger toward an upper portion. Accordingly, an inner diameter d1 on the lowermost surface is set at 300 nm, and an inner diameter d3 on the uppermost surface is set at 1 μm. A material of the metal scatterer 2 for generating the optical near-field is gold, a width w3 is set at 100 nm, and a thickness t1 is set at 50 nm. A recessed portion is formed on the upper surface of the slider, and a micro lens 23 is formed on a bottom surface of the recessed portion. Centers of the coil 3, the optical near-field generating element 2, and micro lens 23 are coaxially arranged, and a focus of the micro lens 23 is located on the upper surface of the coil. In the present embodiment, a numerical aperture of the micro lens 23 is set at 0.75. A semiconductor laser 26 is used as a light source and is placed on the upper surface of the slider 1. Light from the semiconductor laser 26 is collimated by a collimator lens 25. The collimated light is refracted by a mirror 24 and is made incident on the micro lens 23. For reproduction of recording bits, Giant Magneto Resistive (GMR) element or Tunneling Magneto Resistive (TMR) element 36 is formed in the vicinity of the coil.

Figure 30:
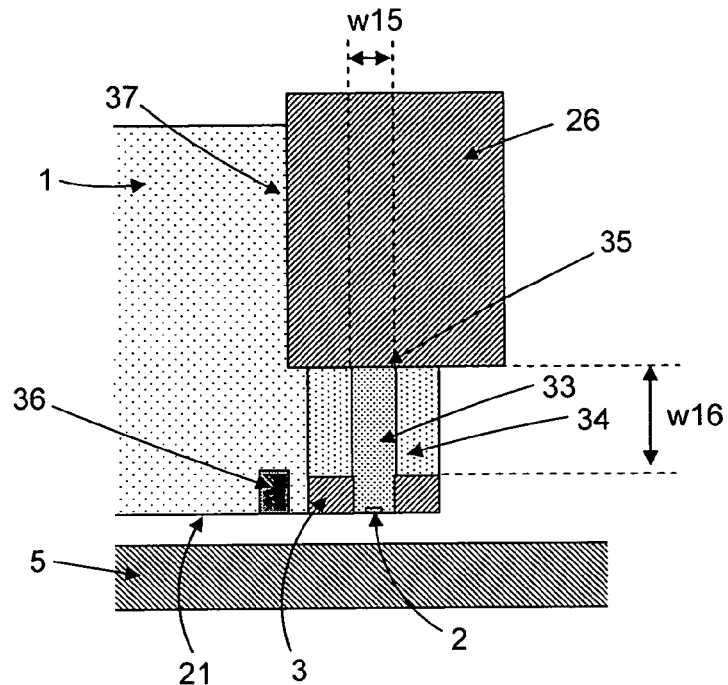
FIGS. 30A and 30B are views showing examples of the recording heads using a waveguide of the present invention.
Figure 30:
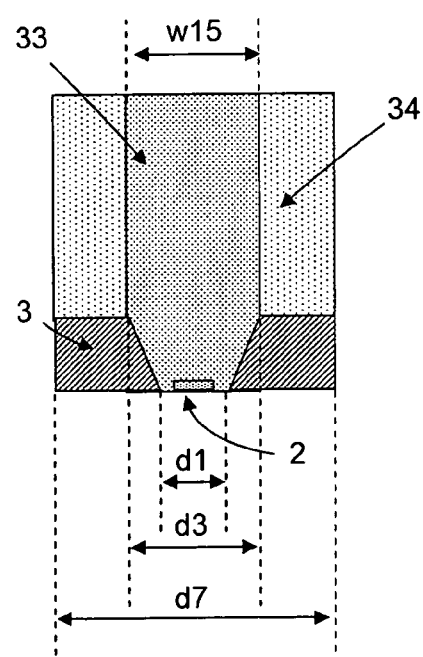

FIG. 30A shows an embodiment of a head into which light is introduced by using a waveguide, instead of using a lens. In the present embodiment, a waveguide 33 is formed on an upper portion of the coil 3 in which the metal scatterer 2 is placed in the center, and a semiconductor laser 26 is placed thereabove. As shown in FIG. 16, the coil 3 is square in shape, a material thereof is copper, and sizes thereof are set at w8=300 nm, w9=300 nm, w1=1 μm, w2=50 nm, and t2=700 nm. The scatterer 2 is square in shape as shown in FIG. 16, a material thereof is gold, sizes thereof are set at w4=90 nm, w5=30 nm, and t2=50 nm. A cross section of a waveguide core portion is square in shape, a material thereof is $Ta_2O_5$, a width w15 is set at 400 nm, and a length w16 is set at 50 μm. A waveguide circumference (a clad portion) 34 is $SiO_2$. The center of the waveguide is made substantially congruent with the center of the inside of the coil. A semiconductor laser 26 is fixed to a side surface 37 of the slider 1, so that the light from a light outgoing surface 35 directly enters the waveguide 33. It should be noted that when a diameter w15 of the waveguide is smaller than a spot diameter of the outgoing light of the semiconductor laser, energy loss is caused. To prevent this, it is preferable that the waveguide is tapered so that a diameter of the waveguide becomes gradually larger toward a light incident side (a semiconductor laser side). In the present embodiment, a diameter of the waveguide on the light incident side is set at 1 μm, and a diameter of the waveguide on the light outgoing side is set at 300 nm. For reproduction of recording bits, GMR or TMR element is formed in the vicinity of the coil.

In a head using the above-described waveguide, when a width of the inside of the coil is smaller than a width of the waveguide core, the incident light is reflected or scattered in a junction portion between the inside of the coil and the waveguide core. As a result, energy loss is caused. To prevent this, it is preferable that a width of the inside of the coil is made equal to, or larger than, a width of the wavelength core. In this case, as shown in FIG. 30B, a width d1 in the inside of the coil in the lower portion of the coil is made smaller than a width d3 in the inside of the coil in the upper portion of the coil, so that an amount of the background light leaking out of the circumference of the scatterer can be reduced. In the present embodiment, the coil 3 is square in shape, a width d3 of the inside of the coil in the upper portion is set at 500 nm, a width d1 of the inside of the coil in the lower portion of the coil is set at 300 nm, a width d7 of an outer side of the coil is set at 2.3 μm, and a material thereof is copper. The scatterer 2 is rectangular in shape, a material thereof is gold, and sizes are set at w4=90 nm, w5=30 nm, and t2=50 nm. A cross section of the waveguide is also square in shape, a width w15 of a waveguide core is set at w15=500 nm, and a length w16 is set at 50 μm. A material of the waveguide is $Ta_2O_5$, and the inside of the coil is also filed with the same material.

Thirteenth Embodiment

Next, an application of the head of the present invention to a recording device will be described.

Figure 31:
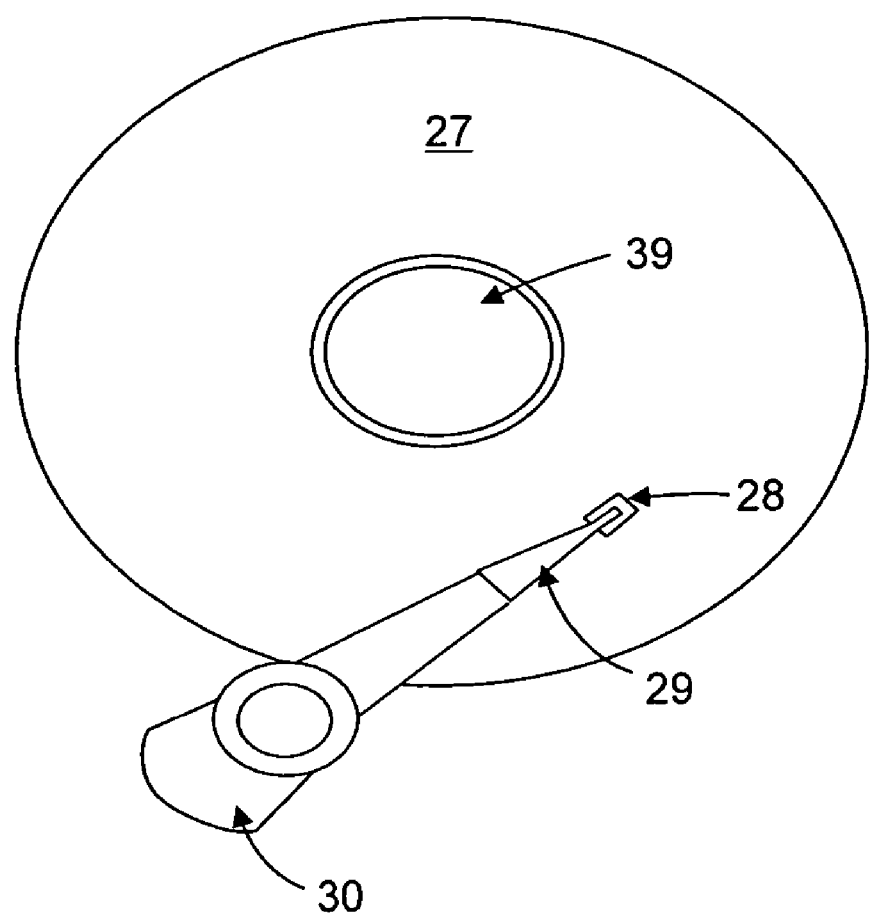
FIG. 31 is a view showing a configurational example of the recording and a reproducing device.

FIG. 31 shows an embodiment in which the head of the present invention is applied to a thermally assisted magnetic recording device. A recording head 28 of the present invention is fixed to a suspension 29, and a position of the recording head is moved by a voice coil motor 30. A floating pad is formed on the head surface, and the head is caused to be floated above the recording disk 27 with a flying height of not more than 10 nm. As the recording disk 27, a magneto-optical recording medium is used. The recording disk 27 is fixed to a spindle 39, which is rotatably driven by a motor. Accordingly, the recording head is rotated. At the right moment of recording, a recording mark is formed by applying a magnetic field to the coil 3 and concurrently emitting light from the laser 26. For reproduction, GMR or TMR element formed on the surface of the recording head 28 is used.

What is claimed is:

1. A head for a thermally assisted magnetic recording device, comprising:
   a coil for generating a magnetic field; and
   a scatterer having conductivity for generating an optical near-field, the scatterer being placed in an inside aperture of the coil,
   wherein a width of the inside aperture of the coil is not larger than a wavelength of light incident on the coil,
   wherein the width of the inside aperture of the coil is not smaller than a half of the wavelength of the light incident on the coil.

2. The head for a thermally assisted magnetic recording device according to claim 1, wherein an outer diameter of the coil is larger than a spot diameter of the light incident on the coil.

3. The head for a thermally assisted magnetic recording device according to claim 1, wherein the width of the inside aperture of the coil is larger in a side where the light is made incident on the coil than in a side where the light goes out of the coil.

4. The head for a thermally assisted magnetic recording device according to claim 1, wherein a width of the coil wire is relatively narrowed near a portion where the optical near-field is generated.

5. The head for a thermally assisted magnetic recording device according to claim 1, wherein a thickness of wiring of the coil wire is relatively thin near a portion where the optical near-field is generated.

6. The head for a thermally assisted magnetic recording device according to claim 1, where the coil is shaped like a curve whose curvature is relatively small near a portion where the optical near-field is generated.

7. The head for a thermally assisted magnetic recording device according to claim 1,
wherein the scatterer is in contact with the coil wire.

8. A head for a thermally assisted magnetic recording device, comprising:
a coil for generating a magnetic field; and
a scatterer having conductivity for generating an optical near-field, the scatterer being placed in an inside aperture of the coil,
wherein a width of the inside aperture of the coil is not larger than a wavelength of light incident on the coil,
wherein the coil has a slit in a portion in between where leader lines for conducting an electric current to the coil are located, and an interval of the slit is not larger than a half of the wavelength of the light incident on the coil.

9. The head for a thermally assisted magnetic recording device according to claim 8, wherein a direction of polarization of the light incident on the coil is a direction parallel to the slit.

10. A head for a thermally assisted magnetic recording device, comprising:
a coil for generating a magnetic field; and
a scatterer having conductivity for generating an optical near-field, the scatterer being placed in an inside aperture of the coil,
wherein a width of the inside of the coil is not larger than a wavelength of light incident on the coil,
wherein a width of the coil wire is smaller than a width represented by a value obtained by the following expression:

$\sqrt{2/\sigma\mu\omega}$ where $\sigma$ denotes conductivity of wiring material, $\mu$ denotes magnetic permeability, and $\omega$ denotes angular frequency of an alternating current flowing through the coil.

11. A head for a thermally assisted magnetic recording device, comprising:
a coil for generating a magnetic field; and
a scatterer having conductivity for generating an optical near-field, the scatterer being placed in an inside aperture of the coil,
a material placed in the inside aperture of the coil,
wherein the coil has a slit in a portion in between where leader lines for conducting an electric current to the coil are located,
wherein a width of the inside of the coil aperture is not larger than a wavelength of light incident on the coil,
wherein a refraction index of a material placed in the inside aperture of the coil is larger than a refraction index of the material placed in a slit of the coil, the slit being provided in a portion where leader lines for conducting an electric current to the coil are located.

12. A head for a thermally assisted magnetic recording device, comprising:
a coil for generating a magnetic field; and
a scatterer having conductivity for generating an optical near-field, the scatterer being placed in an inside aperture of the coil,
wherein a width of the inside of the coil aperture is not larger than a wavelength of light incident on the coil,
wherein the coil has a slit in a portion in between where leader lines for conducting an electric current to the coil are attached located, and wherein a film having shading performance is formed in any one of an upper portion and a lower portion of the slit.

* * * * *